(12) United States Patent
Yun et al.

(10) Patent No.: US 7,326,450 B2
(45) Date of Patent: *Feb. 5, 2008

(54) HIGH-SPEED HIGH-TEMPERATURE NEMATIC LIQUID CRYSTAL COMPOSITION AND LIQUID CRYSTAL DISPLAY COMPRISING THE SAME

(75) Inventors: Yong-Kuk Yun, Suwon (KR); Bong-Hee Kim, Goyang (KR); Bong-Sung Seo, Seongnam (KR); Byeong-Seob Ban, Yongin (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/522,683

(22) PCT Filed: Jul. 23, 2003

(86) PCT No.: PCT/KR03/01476

§ 371 (c)(1),
(2), (4) Date: Jan. 30, 2006

(87) PCT Pub. No.: WO2004/013254

PCT Pub. Date: Feb. 12, 2004

(65) Prior Publication Data

US 2006/0118763 A1    Jun. 8, 2006

(30) Foreign Application Priority Data

Aug. 1, 2002  (KR) .................. 10-2002-0045564

(51) Int. Cl.
*C09K 19/30* (2006.01)
*C09K 19/12* (2006.01)
*C09K 19/20* (2006.01)
*C09K 19/42* (2006.01)
*G02F 1/1333* (2006.01)

(52) U.S. Cl. ............. 428/1.3; 252/299.63; 252/299.66; 252/299.67; 252/299.01; 349/186

(58) Field of Classification Search ................. 428/1.1; 252/299.63, 299.66, 299.01, 299.67; 349/186
See application file for complete search history.

(56) References Cited

U.S. PATENT DOCUMENTS

| 4,770,503 | A | * | 9/1988 | Buchecker et al. ....... 252/299.5 |
| 4,970,022 | A | * | 11/1990 | Scheuble et al. ....... 252/299.61 |
| 5,578,241 | A | | 11/1996 | Plach et al. ............ 252/299.01 |
| 6,221,544 | B1 | * | 4/2001 | Hayashi et al. ................ 430/7 |
| 6,573,964 | B1 | * | 6/2003 | Takizawa et al. ........... 349/129 |

(Continued)

FOREIGN PATENT DOCUMENTS

EP           1126006        *   8/2001

(Continued)

*Primary Examiner*—Shean C Wu
(74) *Attorney, Agent, or Firm*—Cantor Colburn LLP

(57) ABSTRACT

The present invention relates to a high-speed high-temperature nematic liquid crystal composition and a liquid crystal display comprising the same, particularly to a high-speed high-temperature nematic liquid crystal composition which comprises a nematic liquid crystal compound having an isothionate group on the end aromatic ring and having one or more kinds of fluorine atoms, and thus satisfies a high response speed property and has a high phase transition temperature of liquid crystal, a low operating voltage, and a broad nematic phase temperature range, and a liquid crystal cell comprising the same, and a liquid crystal display using the same.

14 Claims, 14 Drawing Sheets

U.S. PATENT DOCUMENTS

| | | | |
|---|---|---|---|
| 6,590,226 B2* | 7/2003 | Kong et al. | 257/59 |
| 6,970,220 B2* | 11/2005 | Park et al. | 349/129 |
| 7,045,176 B2* | 5/2006 | Yun et al. | 428/1.1 |
| 7,063,805 B2* | 6/2006 | Ban | 252/299.63 |
| 2002/0030180 A1* | 3/2002 | Tarumi et al. | 252/299.61 |
| 2002/0053701 A1* | 5/2002 | Kong et al. | 257/347 |
| 2002/0113931 A1* | 8/2002 | Park et al. | 349/141 |
| 2002/0142108 A1* | 10/2002 | Poetsch et al. | 428/1.1 |
| 2005/0062018 A1* | 3/2005 | Ban et al. | 252/299.63 |

FOREIGN PATENT DOCUMENTS

| | | |
|---|---|---|
| JP | 2003-129052 | 5/2003 |
| WO | WO 03/035798 A1 | 5/2003 |

* cited by examiner

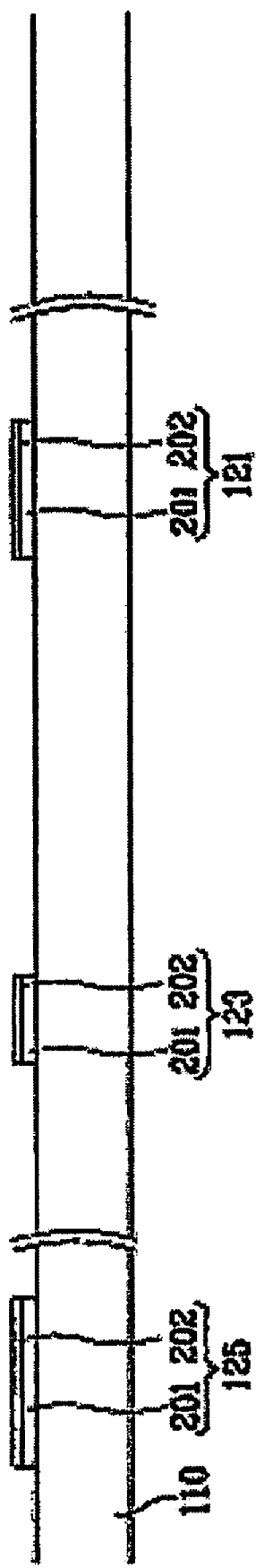

HIGH-SPEED HIGH-TEMPERATURE NEMATIC LIQUID CRYSTAL COMPOSITION AND LIQUID CRYSTAL DISPLAY COMPRISING THE SAME

BACKGROUND OF THE INVENTION (a) Field of the Invention

The present invention relates to a high-speed high-temperature nematic liquid crystal composition and a liquid crystal display comprising the same, and particularly to a high-speed high-temperature nematic liquid crystal composition comprising a nematic crystal liquid compound that has a high phase liquid crystal transition temperature, large birefringence and elasticity coefficients, and a broad operating nematic phase temperature range, and thus can realize a high response speed and is effective for various devices requiring liquid crystal such as LCDs, etc., and a liquid crystal cell comprising the same and a liquid crystal display using the same.

(b) Description of the Related Art

Generally, a liquid crystal display is a device in which liquid crystal material is injected between an upper substrate on which opposite electrodes and color filters, etc. are formed, and a lower substrate on which a thin film transistor and pixel electrodes, etc. are formed, and wherein different electric potentials are applied to the pixel electrodes and the opposite electrodes to form an electric field to change an arrangement of liquid crystal molecules, thereby controlling transmissivity of light to embody images.

Liquid crystal displays are divided into TN (Twist Nematic), STN (Super Twist Nematic), and ferroelectric liquid crystal displays of the passive matrix method, and TFT (Thin Film Transistor), MIM (Metal Insulator Metal), and diode liquid crystal displays of the active matrix method, according to operation type.

For an active matrix method, high voltage maintenance with a low leak current is important because a liquid crystal display is operated with switching devices such as TFTs or MIMs for each pixel. In addition, a liquid crystal display tends to require a high response speed due to an increase in display information amount and for embodiment of moving pictures.

The thin film transistor substrate is used as a circuit substrate for independently operating each pixel in a liquid crystal display or an organic electroluminescence (EL) display, etc. On the thin film transistor substrate, scanning signal wiring or gate wiring for transmitting scanning signals, and picture signal lines or data wiring for transmitting picture signals are formed, and it comprises a thin film transistor connected with the gate wiring and data wiring, pixel electrodes connected with the thin film transistor, a gate insulating film that covers the gate wiring to insulate it, and a protection film that covers the thin film transistor and the data wiring to insulate them. The thin film transistor comprises a semiconductor layer that forms a gate electrode and a channel, which are parts of gate wiring; a source electrode and drain electrode, which are parts of data wiring; and a gate insulating film and a protection film, etc. The thin film transistor is a switching device for transmitting or blocking picture signals transmitted through data wiring according to scanning signals transmitted through gate wiring.

In addition, a nematic liquid crystal composition is used as an important material for a liquid crystal display (LCD) used for electronic computers, electronic notebooks, personal computers, etc. And recently, it has widely spread as a display for high speed information treatment for word processors, personal computers, etc.

However, because nematic liquid crystal compositions known so far have a low response speed, it is difficult to adequately embody moving pictures with them.

In order to solve these problems, the following requirements should be satisfied. First, in order to improve a response speed, the viscosity of a liquid crystal material should decrease to a range of 20 to 25 $mm^2/s$. Second, in order to lower an operating voltage, a dielectric anisotropy ($\Delta\in$) thereof should increase to a range of 10 to 15 (35° C., 1 kHz). Third, a liquid crystal material should have a nematic phase over a broad temperature range, and preferable the nematic phase temperature range is −30 to 80° C. Forth, birefringence ($\Delta n$) should be 0.20 (25° C.) or more.

In addition, although the LCD has physical advantages of lightness and smallness, brightness, which is one of various factors determining picture quality, is weak compared to a CRT (Cathode Ray Tube). Additionally, as the LCD-TV market is attracting attention as a large market for monitors, and new LCDs are being produced and disseminated, requirements for high brightness and high response speed become very important.

In order to achieve high brightness in an LCD, the phase transition temperature of liquid crystal should be maintained high due to a tube current in the back light. Also, for a high response speed, the rotation viscosity of the material should decrease or the refractive index of liquid crystal should increase.

Most LCD products marketed to date use nematic liquid crystal such as TN, IPS, and VA modes, and the phase transition temperature thereof is about 70 to 80° C. and response speed is about 20 to 30 ms. However, since the phase transition temperature and response speed are still unsatisfactory, improvements in response speed and increases in the phase transition temperature are needed in order to realize TV applications and moving pictures.

In addition, it is well known that a liquid crystal material having high birefringence ($\Delta n$) and elasticity coefficients is required in order to improve electro-optical characteristics of the TN-LCD, STN-LCD, and TFT-LCD. However, although liquid crystal compounds so far known can improve electro-optical characteristics of liquid crystal material, problems still remain in chemical safety of liquid crystal material and the operating temperature range of a liquid crystal display because if the liquid crystal compounds are used, birefringence of the mixed liquid crystal increases but a smectic phase easily appears or the operating nematic phase temperature range is narrow.

SUMMARY OF THE INVENTION

The present invention is made in consideration of the problems of the prior art, and it is an object of the present invention to provide a novel nematic liquid crystal compound that does not largely increase operation voltage, that increases birefringence ($\Delta n$) and elasticity coefficients (K11, K33), and that broadens an operating nematic phase temperature range and thus makes response speed high, and a nematic liquid crystal composition comprising the same.

It is another object of the present invention to provide a nematic liquid crystal composition that has a high phase transition temperature of liquid crystal and that can realize a high response speed.

It is another object of the present invention to provide a liquid crystal cell comprising the above nematic liquid crystal composition, and a liquid crystal display with improved electro-optical properties using the same.

In order to achieve these objects, the present invention provides a nematic liquid crystal composition comprising a nematic liquid crystal compound represented by the following Chemical Formula 1:

[Chemical Formula 1]

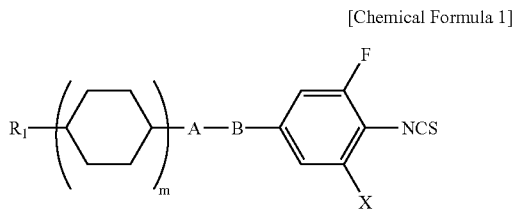

wherein $R_1$ is $C_nH_{2n+1}$ or $C_nH_{2n-1}$ (n is 1~15); X is H or F; A is

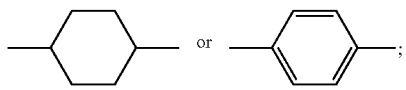

B is —$CH_2$—$CH_2$— or —C≡C—; and m is 0 or 1.

The present invention also provides a liquid crystal cell for a liquid crystal display in which the above nematic liquid crystal composition is injected as liquid crystal between two glass substrates or plastic substrates.

Specifically, the present invention provides a liquid crystal display comprising:

a first substrate having an outside and an inside;

a second substrate opposed to the first substrate and having an outside and an inside;

pixel electrodes formed on one of the insides of the first substrate and the second substrate;

common electrodes formed on one of the insides of the first substrate and the second substrate; and liquid crystal cells in which the above nematic liquid crystal composition is injected as liquid crystal between the first substrate and the second substrate.

A 1-gradation voltage applied between the pixel electrode and the common electrode is preferably a value in a range within which a standardized contrast ratio becomes 0.8 or more in every view angle, when standardizing the contrast ratio for applying 0V of the 1-gradation voltage as 1.

Additionally, the liquid crystal display preferably comprises a thin film transistor array substrate comprising an insulating substrate; gate wiring formed on the insulating substrate, comprising gate lines and gate electrodes connected with the gate lines; a gate insulating film covering the gate wiring; a semiconductor layer formed on the gate insulating film; data lines formed on the semiconductor layer and crossed with the gate lines; source electrodes connected with the data lines; data wiring comprising drain electrodes opposed to the source electrodes around the gate electrodes; and pixel electrodes connected with the drain electrodes, as the lower substrate.

BRIEF DESCRIPTION OF THE DRAWINGS

FIG. 4b is a cross-sectional view along the line VIb-VIb' in FIG. 4a;

DETAILED DESCRIPTION AND THE PREFERRED EMBODIMENTS

Figure 1A:
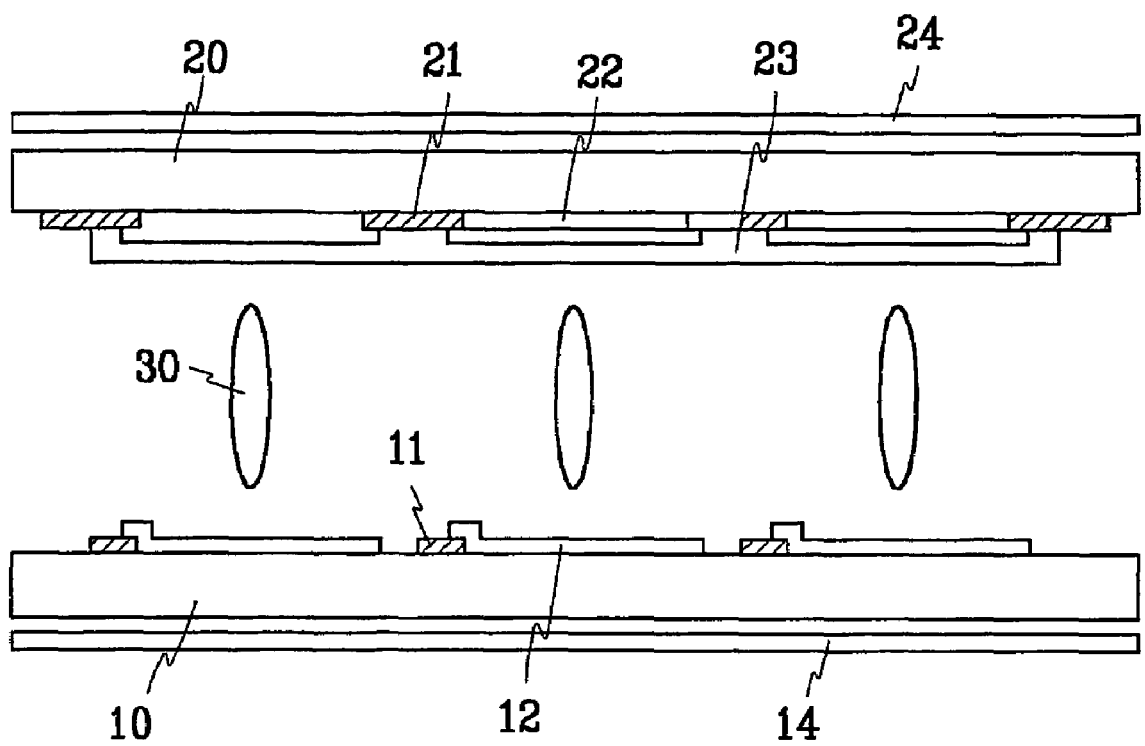
FIG. 1a is a cross-sectional view of the liquid crystal display according to a first example of the present invention.

The present invention will now be explained in detail.

The present invention is characterized by a nematic liquid crystal composition comprising a nematic liquid crystal compound of the above Chemical Formula 1 that lowers viscosity of liquid crystal, increases dielectric anisotropy and birefringence thereof, and broadens a nematic phase temperature range to make a response speed high; and a liquid crystal cell using the same as liquid crystal material; and a liquid crystal display using the same that can realize high brightness and high response-speed technology.

First, the nematic liquid crystal composition used for liquid crystal material in the liquid crystal display of the present invention will be explained in detail.

The nematic liquid crystal composition of the present invention blends a compound of the above Chemical Formula 1 with a conventional commercial liquid crystal composition as a key material, thereby elevating a phase transition temperature by at least 10° C. compared to the existing commercial liquid crystal, and realizing a response speed of approximately 10 ms.

In addition, the nematic liquid crystal composition comprising a compound of the above Chemical Formula 1 as a key material has a significantly high birefringence (Δn) of 0.20 or more, and a very broad nematic phase temperature range of approximately 140° C. or more. If a liquid crystal compound selected from a group consisting of the compounds of the following Chemical Formulae 2 to 6, substituted by a fluorine atom and having a tolane group as a connection group added, the elasticity coefficient of the nematic liquid crystal composition increases to make the response speed high. In addition, since the compound of the above Chemical Formula 1 has very good compatibility with additive compounds, a nematic liquid crystal composition showing excellent properties can be obtained without sacrificing good properties of essential components.

The nematic liquid crystal composition of the present invention preferably comprises at least 2 kinds of liquid crystal compounds, one or more kinds of compounds selected from a group consisting of the compounds of the above Chemical Formula 1 as a key material, and one or more kinds of compounds selected from a group consisting of the compounds of the above Chemical Formula 2 as a key material.

More preferably, the liquid crystal composition of the present invention further comprises 5 to 40 wt % of one or more kinds of compounds selected from a group consisting of the following Chemical Formulae 2, 3, 4, and 5 with triple bonds, to increase birefringence (Δn) and the elasticity coefficient and to make the response speed much higher.

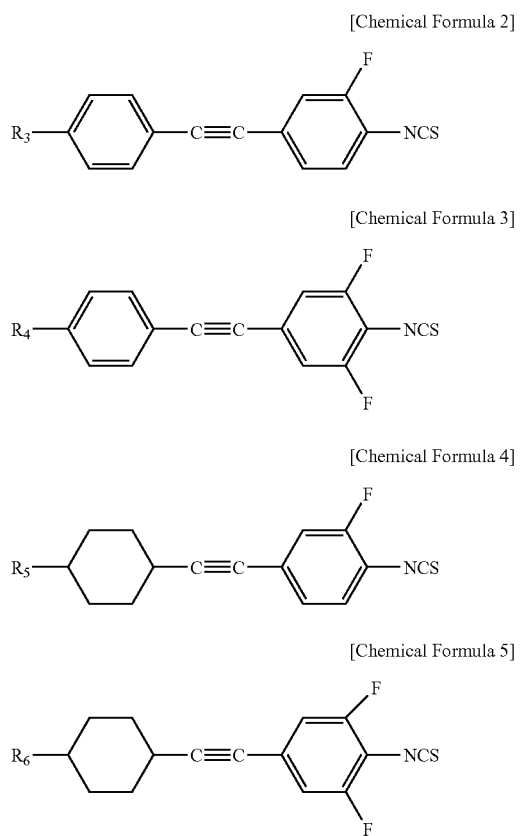

(wherein each of $R_5$~$R_6$ is preferably a linear alkyl chain of $C_nH_{2n+1}$ (n is an integer of 3~7) or a linear alkyl chain of $CH_5C_nH_{2n-2}$ (n is an integer of 2 to 6) having one double bond in the middle of an alkyl chain.)

In addition, the liquid crystal composition of the present invention may use generally-known nematic liquid crystal, smectic liquid crystal, cholesteric liquid crystal, etc. in addition to the liquid crystal compound of the above Chemical Formula 1 that is used to improve properties of a liquid crystal composition. However, since desired properties of a liquid crystal composition may decrease if such liquid crystal compound is added in a large amount, the added amount should be limitedly determined according to desired properties of the nematic liquid crystal composition.

The nematic liquid crystal composition of the present invention preferably comprises the conventional nematic liquid crystal compound together with the nematic compound of the above Chemical Formula 1.

Preferably, as the compound of the above Chemical Formula 1, compounds of the following Chemical Formulae 1a to 1k can be used alone or in combination.

[Chemical Formula 1a]
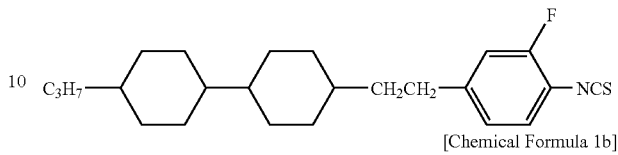

[Chemical Formula 1b]
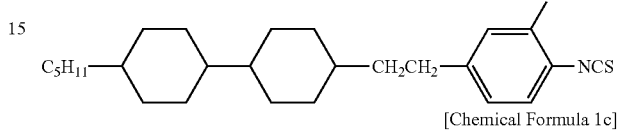

[Chemical Formula 1c]
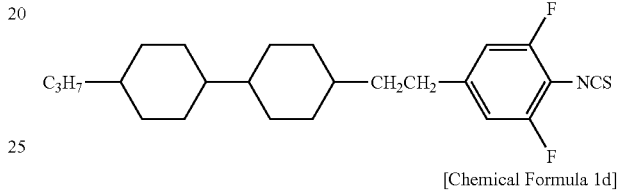

[Chemical Formula 1d]
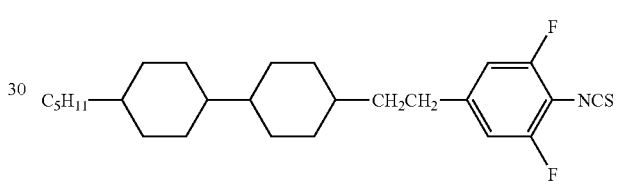

[Chemical Formula 1e]
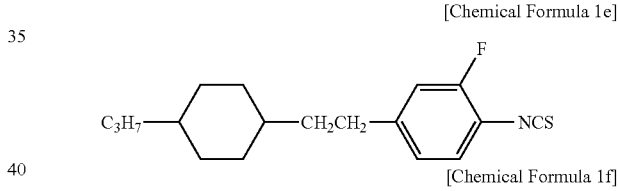

[Chemical Formula 1f]
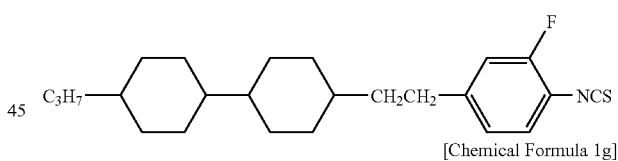

[Chemical Formula 1g]
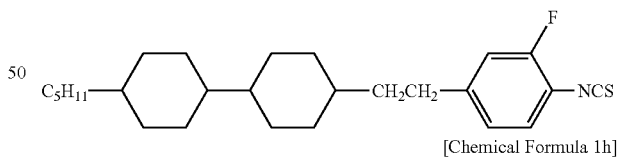

[Chemical Formula 1h]
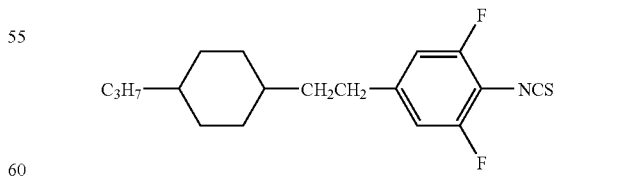

[Chemical Formula 1i]
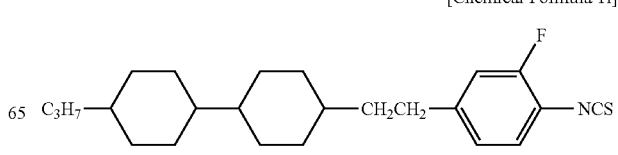

-continued

[Chemical Formula 1j]

[Chemical Formula 1k]

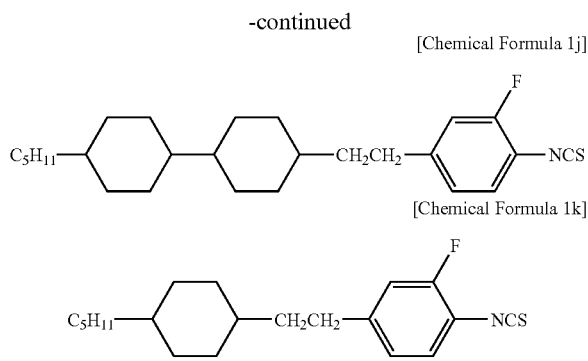

It is more preferable to use the compound of the above Chemical Formula 1f and the compound of the Chemical Formula 1 g together. In such a case, a mixing ratio of the compound of the Chemical Formula 1f and the compound of the Chemical Formula 1 g is preferably 1 to 80:1 to 80 by weight ratio. Additionally, it is more preferable to use the compounds of the Chemical Formulae 1i, the Chemical Formula 1j, and the Chemical Formula 1 k together. In such a case, the mixing ratio of the compounds of the above Chemical Formulae 1i, 1j, and 1k is preferably 1 to 80:1 to 80:1 to 80 by weight ratio.

The compound of the above Chemical Formula 1 is preferably contained in an amount of 2 to 80 wt %, and if the used amount of the compound of the Chemical Formula 1 exceeds this range, a high phase transition temperature and high response speed cannot be obtained.

"In addition, it is preferable to use at least one kind of commercial liquid crystal compound. The commercial liquid crystal compound is preferably one or more kinds selected from a group consisting of the compounds of the following Chemical Formulae 6, 7, and 8. The content of the commercial liquid crystal compound are preferably 20 to 98 wt %.

[Chemical Formula 6]

[Chemical Formula 7]

[Chemical Formula 8]

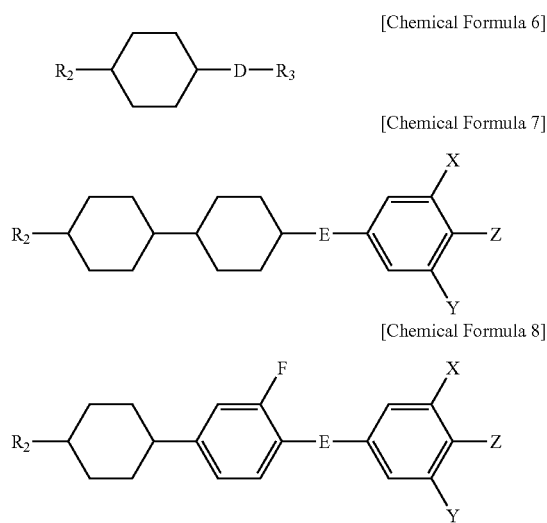

wherein $R_2$ and $R_5$ are independently or simultaneously C1-15 alkyl or alkoxy groups; D is phenyl or cyclohexyl; C is a single bond —$CH_2CH_2$— or —COO—; X and Y are independently or simultaneously a hydrogen or fluorine atom; and Z is a hydrogen, —$OCF_3$, or a fluorine atom."

As the commercial liquid crystal compound, the compounds of the Chemical Formulae 6, 7, and 8 can be used in combination, and for example, it is more preferable to divide the compounds of the Chemical Formulae 6 to 8 into 4 groups (G1 to G4) and use them together. The G1 to G4 preferably comprise 25 to 45% of G1, 15 to 25 wt % of G2, 10 to 20 wt % of G3, and 15 to 30 wt % of G4. Preferably, G1 group compounds are at least two kinds of compounds selected from a group consisting of the compounds of the above Chemical Formula 6; G2 compounds are at least 2 kinds of compounds selected from a group consisting of the compounds of the above Chemical Formula 7 and 8; G3 compounds are at least 2 kinds of compounds selected from a group consisting of the compounds of the Chemical Formula 7; and G4 compounds are at least 2 kinds of compounds selected from a group consisting of the compounds of the Chemical Formulae 7 and 8. However, the mixing ratio is not limited to them, and variation can be made according to the kinds of the Chemical Formula 1.

The present invention also provides a liquid crystal cell comprising a nematic liquid crystal composition comprising the compound of the Chemical Formula 1.

The liquid crystal cell of the present invention comprises the above liquid crystal composition and thus has large birefringence, a high response speed, and superior cell parameters such as phase transition temperature. Preferably, birefringence ($\Delta n$) is 0.2 or more. Also, the phase transition temperature is at least 85° C. and preferably 90° C., and the nematic phase temperature range is −30 to 80° C. Additionally, the response speed of the liquid crystal is preferably 9 to 11 ms.

The liquid crystal cell of the present invention consists of two glass substrates or transparent plastic substrates, and the nematic liquid crystal composition comprising the compound of the Chemical Formula 1 is injected therebetween.

Transparent electrodes making up pixels are located inside of the two glass substrates, and an orientation film for orienting liquid crystal molecules toward one direction is located thereon. Between the glass substrates, a constant distance is maintained so that liquid crystal can be injected, and in the case of a display with a broad area, the distance is maintained by a spacer. Liquid crystal is injected in the space and oriented. On the side of the cell, an electrode pattern connected with the transparent electrode is located, and an external voltage is transmitted to the liquid crystal through the pattern. On an active matrix liquid display, patterns for operating an active device are formed, and the active device is operated through the patterns and simultaneously an external voltage is applied to the liquid crystal.

In order to apply the liquid crystal cell for a liquid crystal display, a display electrode pattern should be formed. There are two methods to achieve this: one is to place a mask punched with the same shape as the electrode to attach conductive films only in the same shape as the pattern; and the other is a photo-etching method used for making a much finer pattern, by printing an electrode pattern on a glass substrate to which an ITO film is attached in the same way as printing a film to dissolve the parts other than at the pattern with chemicals. The 2 glass substrate sheets are joined with a space of about 10 microns, and then liquid crystal is filled between the sheets. At this time, an empty cell is firstly assembled and its side is mostly sealed, and liquid crystal is injected through a small unsealed part using a capillary method, a method using a pressure difference, or a method for making a vacuum condition and injecting. The hole through which liquid crystal is injected is then sealed with adhesive to complete the liquid crystal cell. The prepared liquid crystal cell is inserted between 2 polarizing plate sheets, and a reflecting plate is laid down so as to give a light source to complete a liquid crystal panel for a display. A color filter between the liquid crystal cell and the polarizing plate can also be considered, and since the distance between the 2 sheets of the liquid crystal cells is approximately 10 microns and thus dust is likely to contaminate the circuit, it is preferable to manufacture the liquid crystal panel in a clean room completely equipped with dustproof equipment.

The present invention also provides liquid crystal displays of various LCD product groups using the nematic liquid phase composition as liquid crystal material by filling it in liquid crystal cells for various displays together with appropriate additives. Preferably, an active matrix method TFT liquid crystal display, an active matrix method MIM liquid crystal display, an active matrix method IPS (In-plane switching) liquid crystal display, a simple matrix type twist nematic liquid crystal display, a simple matrix type super twist nematic liquid crystal display, a thin film transistor-twist nematic (TFT-TN) liquid crystal display, an AOC (Array on color filter) liquid crystal display, or a COA (Color filter on array) liquid crystal display, etc. comprising the nematic liquid crystal composition can be manufactured.

In an active matrix liquid crystal display, an active device diode or transistor is formed on the side of the pixel on the lower substrate. A color liquid crystal display is equipped with a color filter so that color can be displayed on the upper substrate. The color filter is placed between the transparent electrode and the glass substrate, and it may be formed by a pigment spray method, a dyeing method, etc. on the glass substrate. A thus-prepared liquid crystal display of the present invention has a superior high speed response and high heat resistance, and has little afterimage and plica and thus it can be used under any circumstances.

Now, a liquid crystal display comprising the liquid crystal cell according to a preferred example of the present invention will be explained in detail so that a person ordinarily skilled in the art can easily work it.

The liquid crystal display of the present invention comprises the lower substrate on which pixel electrodes having openings and thin film transistors are formed, the upper substrate on which common electrodes having openings are formed, and a liquid crystal cell between the lower substrate and the upper substrate, oriented perpendicularly to the two substrates, in which a liquid crystal composition comprising the nematic liquid crystal compound of the above Chemical Formula 1 is injected as liquid crystal. On the outside of the upper substrate and the lower substrate, the upper polarizing plate and the lower polarizing plate are respectively arranged with their polarizing directions perpendicular to each other.

Figure 1B:
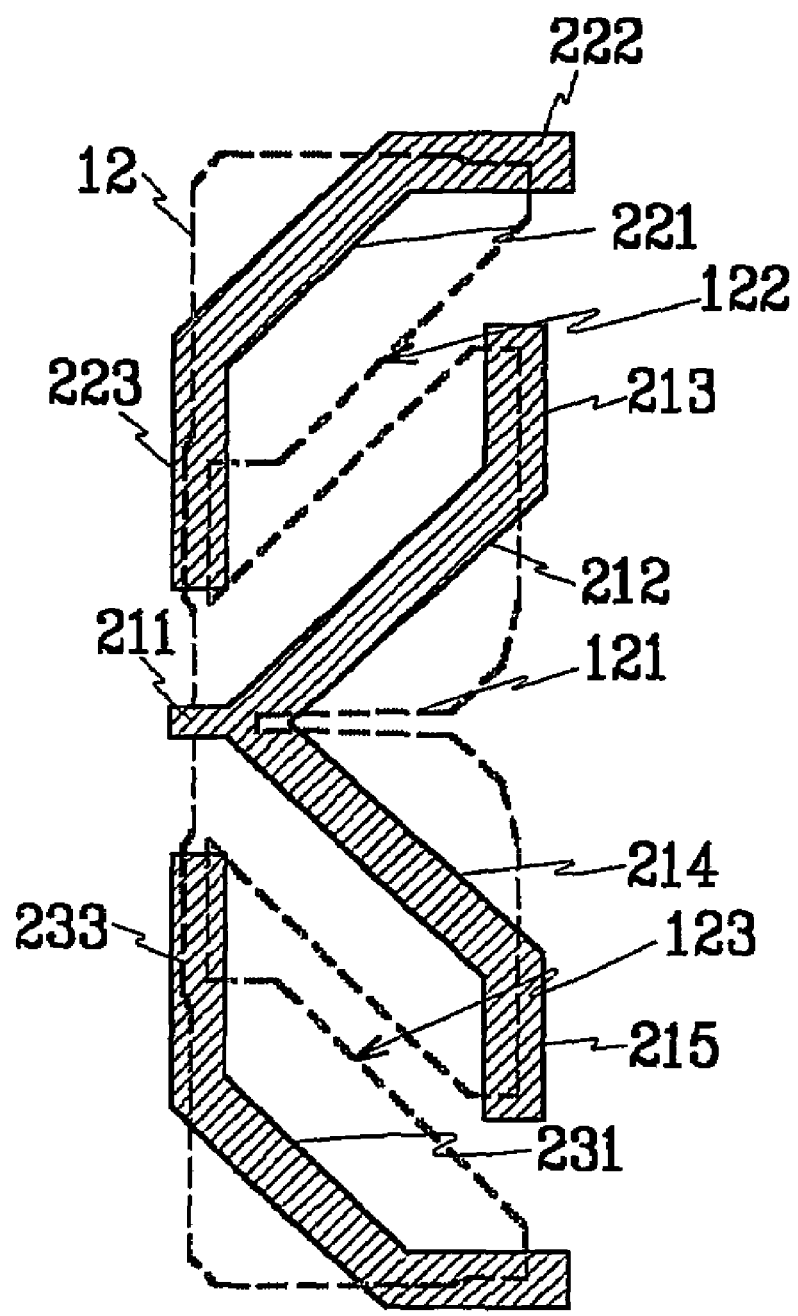
FIG. 1b is an arrangement view of the liquid crystal display according to the first example of the present invention wherein opening patterns of pixel electrodes and common electrodes are overlapped with each other.

FIG. 1*a* is a cross-sectional view of the liquid crystal display according to the first example of the present invention, and FIG. 1*b* is an arrangement view of the liquid crystal display according to the first example of the present invention wherein opening patterns of pixel electrodes and common electrodes are overlapped.

The liquid crystal display comprises the lower substrate (10), the upper substrate (20) opposed to the lower substrate, and a liquid crystal cell (30) comprising the high-speed high-temperature liquid crystal material of the present invention as liquid crystal, which is injected between the lower substrate (10) and the upper substrate (20) and oriented perpendicularly to the substrates (10, 20).

On the lower substrate (10) consisting of transparent insulating material such as glass, etc., pixel electrodes (12) consisting of a transparent conductive material such as ITO (indium tin oxide) or IZO (indium zinc oxide), etc. and having opening patterns (not shown) are formed, each of which is connected to a switching device (11) to receive a picture signal voltage. As the switching device (11), a thin film transistor is commonly used, which is connected to a gate line (not shown) transmitting scanning signals, and a data line (not shown) transmitting picture signals and on and off signals for pixel electrodes (12) according to scanning signals. Additionally, under the lower substrate (10), a lower polarizing plate (14) is attached. In the case of a reflection-type liquid crystal display, the pixel electrode (12) might not consist of a transparent material, and in such a case, the lower polarizing plate (14) is unnecessary.

Under the upper substrate (20), also consisting of a transparent insulating material such as glass, etc., a black matrix (21) for preventing light from getting out; red, green, and blue color filters (22); and common electrodes (23) consisting of a transparent conductive material such as ITO or IZO, etc. and having an opening pattern (not shown) are formed. The black matrix (21) or color filters (22) may also be formed on the lower substrate (10). The upper polarizing plate (24) is attached on the upper substrate (20).

The lower polarizing plate (14) and the upper polarizing plate (24) are arranged so that their polarizing directions are perpendicular to each other, and thus as an electric field applied to the liquid crystal layer becomes weaker, a normally black mode where a picture is shown to be dark appears.

In the liquid crystal display, as means for regulating an inclined direction of liquid crystal molecules, an opening pattern is formed on common electrodes and pixel electrodes. The opening pattern will now be explained.

Referring to FIG. 1*b*, in the middle of the rectangular pixel electrode (12), a first opening (121) narrowly dug from the right side to the left side is formed, and both corners of the first opening (121) are gently rounded. Dividing the pixel electrode (12) into an upper part and a lower part with respect to the area of the first opening (121), second and third openings (122, 123) are diagonally formed by digging into the upper part and the lower part of the pixel electrode (12). The second and the third openings (122, 123) are formed to symmetrically angle away from the first opening (121).

On the common electrode, a fourth opening comprising a stem part (211) formed horizontally, first and second branch parts (212, 214) extending diagonally from the stem part (211) respectively in upward and downward directions, and first and second branch end parts (213, 215) respectively extending from the first and the second branch parts (212, 214) vertically upward and downward. Additionally, on the common electrode, a fifth opening comprising a center part (221) formed in a slanted direction parallel with the first branch part (212), a horizontal end part (222) extending horizontally from the center part (221), and a vertical end part (223) extending vertically from the center part (221); and a sixth opening that is symmetrical to the fifth opening around the fourth opening, are formed. The fourth, fifth, and sixth openings with such arrangements are repeatedly formed on the common electrodes.

The first to third openings (121, 122, 123) of the pixel electrode (12) and the fourth to sixth openings of the common electrode are overlapped to divide the pixel electrode (12) into a plurality of areas. The openings (121, 122, 123) of the pixel electrode (12) and the openings of the common electrode are arranged alternatively. The first to sixth openings are formed parallel to each other in most of the areas except at the stem part (211) at the first opening (121), and at the fourth opening dividing the center of the pixel electrode (12), the branch end parts (213, 215) of the fourth opening that overlap the side of the pixel electrode (12), the horizontal end parts (222, 232), and the vertical end parts (223, 233) of the second and third openings.

The lower and upper polarizing plates (14, 24) are arranged so that their polarizing directions become respectively horizontal (0°) and vertical (90°) or vice versa.

Thus, the number of liquid crystal molecules rearranged by application of an electric field to lay down in a polarizing direction of the polarizing plates (14, 24) becomes smaller, and thus a texture appearance decreases. Also, since the liquid crystal molecules arranged by a fringe field are parallel to each other, movement of liquid crystal molecules is completed by a one-step operation. Therefore, response speed is very fast. In addition, openings extend largely in two directions in the pixel area, and these two direction form a 90° angle with each other. Also, since the openings of the upper and the lower plates are alternatively arranged, the direction of the fringe field is classified into 4 directions within one pixel area. Accordingly, a broad view angle can be obtained in all 4 directions.

Now, referring to FIGS. 2 and 3, the structure of a thin film transistor array substrate for the liquid crystal display according to a second example of the present invention will be explained in detail.

According to the thin film transistor array substrate for a liquid crystal display of the second example, gate wiring comprising gate lines and gate electrodes connected with the gate lines are formed on an insulating substrate. A semiconductor layer is formed on a gate insulating film covering the gate wiring, and on the semiconductor layer, data wiring comprising data lines crossed with the gate lines, source electrodes connected with the data lines, and drain electrodes opposed to the source electrodes around the gate electrodes are formed, and pixel electrodes connected with the drain electrodes are formed thereon. The gate wiring or data wiring comprise a conductive film consisting of molybdenum and a molybdenum alloy comprising an additive material making a solid compound together with molybdenum.

Figure 2:
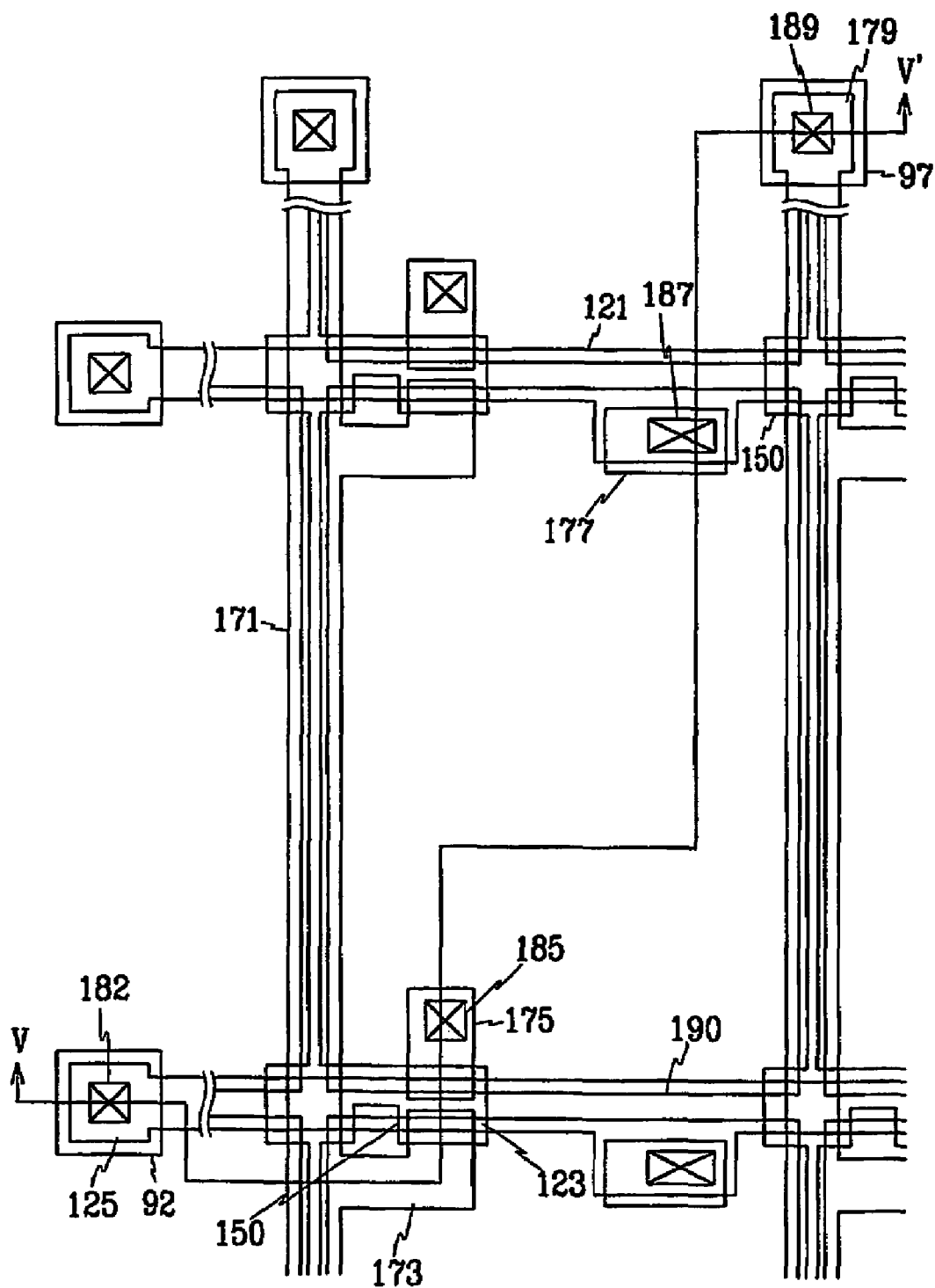
FIG. 2 is an arrangement view of the structure of a thin film transistor substrate for a liquid crystal display according to a second example of the present invention.
Figure 3:
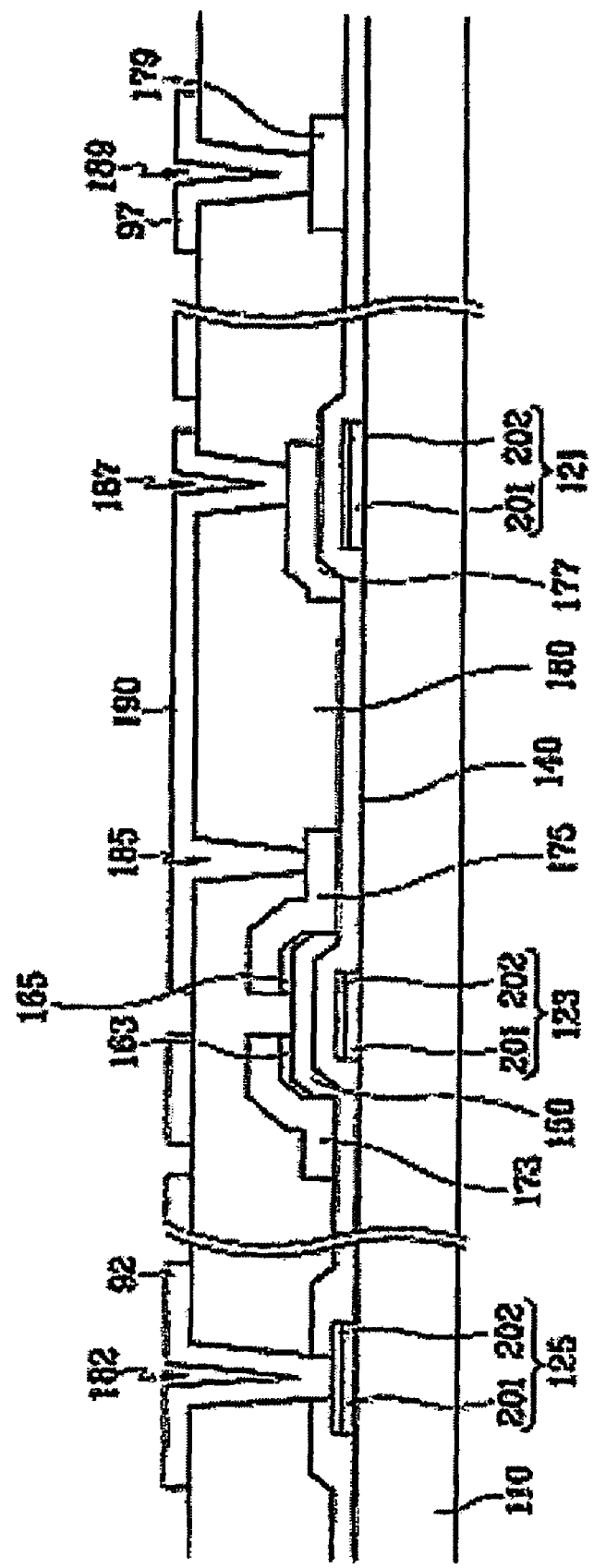
FIG. 3 is a cross-sectional view along the V-V' line in FIG. 2.

FIG. 2 is an arrangement view of the thin film transistor substrate for a liquid crystal display according to the second example of the present invention, and FIG. 3 is a cross-sectional view of the thin film transistor array substrate shown in FIG. 2 along the line V-V'.

On the glass substrate (110), gate wiring comprising a lower film (201) consisting of aluminum or an aluminum alloy with low resistance and an upper film (202) consisting of molybdenum and a molybdenum alloy comprising an additive material making a solid compound together with molybdenum are formed with a tapered structure. The gate wiring comprises a gate line (121) extending horizontally, a gate pad (125) connected to the end of the gate line (121) and receiving gate signals from the outside to transmit it to the gate line, and a gate electrode (123) of the thin film transistor connected with the gate line (121). Also, the gate wiring is overlapped with a conductive pattern (177) for a maintenance capacitor to be formed later and be connected with a pixel electrode (190) for improving a charge maintenance capacity of the pixel.

On the substrate (110), a gate insulating film (140) consisting of silicon nitride (SiNx), etc. covers the gate wiring (121, 125, 123).

On the gate insulating film (140) of the gate electrode (123), a semiconductor layer (150) consisting of a semiconductor such as amorphous silicon, etc. is formed, and on the semiconductor layer (150), ohmic contact layers (163, 165) made of n+ hydrogenated amorphous silicon doped with a high concentration of silicide or n-type impurities are respectively formed.

On the ohmic contact layers (163, 165) or the gate insulating film (140), data wiring consisting of a conductive film of molybdenum and a molybdenum alloy comprising an additive material making a solid compound together with molybdenum are formed. The data wiring comprises a data line (171) formed vertically and crossed with the gate line (121) to define a pixel area, a source electrode (173) connected to the data line (171) and extending to the upper part of the ohmic contact layer (163), a data pad (179) connected to one end of the data line (171) and receiving picture signals from the outside, and a drain electrode (175) separated from the source electrode (173) and formed on the ohmic contact layer (165) opposite the source electrode (173) around the gate electrode (123). Also, the data wiring is overlapped with the gate line (121) in order to improve maintenance capacity, and it may comprise a conductive pattern (177) for the maintenance capacitor to be electrically connected with the pixel electrode (190) to be formed later.

The data wiring (171, 173, 175, 177, 179) may comprise a conductive film of aluminum or an aluminum alloy as does the gate wiring (121, 123, 125), and it may consist of a three-layered film of a conductive film of molybdenum alloy/a conductive film of aluminum or aluminum alloy/a conductive film of molybdenum alloy.

On the data wiring (171, 173, 175, 177, 179), and on the semiconductor layer (150) that is not covered, a protection film (180) comprising an insulating film of a low dielectric insulating material comprising a Si:C:O:H or organic material with superior flattening properties and photosensitivity is formed. The protection film (180) may further comprise an insulating film consisting of silicon nitride, and in such a case, the insulating film is preferably located under the organic insulating film and directly covers the semiconductor layer (150). Also, it is preferable to completely remove all organic insulating material from the pad part on which the gate pad (125) and a data pad (179) are located, which is particularly favorable with a COG (chip on glass) method liquid crystal display which directly installs gate operating integrated circuits and data operating integrated circuits on a thin film transistor substrate in order to respectively transmit scanning signals and picture signals to the upper part of the gate pad (125) and data pad (179) of the pad part.

On the protection film (180), contact openings (185, 187, 189) respectively exposing the drain electrode (175), the conductive pattern for the maintenance capacitor (177), and the data pad (179) are formed, and a contact opening (182) exposing the gate pad (125) together with the gate insulating film (140) is formed.

On the protection film (180), the pixel electrode (190) that is electrically connected with the drain electrode (175) and is located on the pixel area, consisting of the transparent conductive material IZO (indium zinc oxide) or ITO (indium tin oxide) etc., is formed. Also, on the protection film (180), a supplementary gate pad (92) and a supplementary data pad (97) that are respectively connected with the gate pad (125) and data pad (179) through the contact openings (182, 189) are formed. The supplementary gate and data pads (92, 97) are to protect the gate and data pads (125, 179), and they are not essential.

The above-explained thin film transistor substrate according to the second example of the present invention comprises a low resistance molybdenum alloy, and thus it can improve operation properties of a large screen liquid crystal display.

Now, referring to FIGS. 4a to 7b and FIGS. 2 and 3, a manufacturing process of a thin film transistor array substrate according to the second example of the present invention will be explained in detail.

Figure 4A:
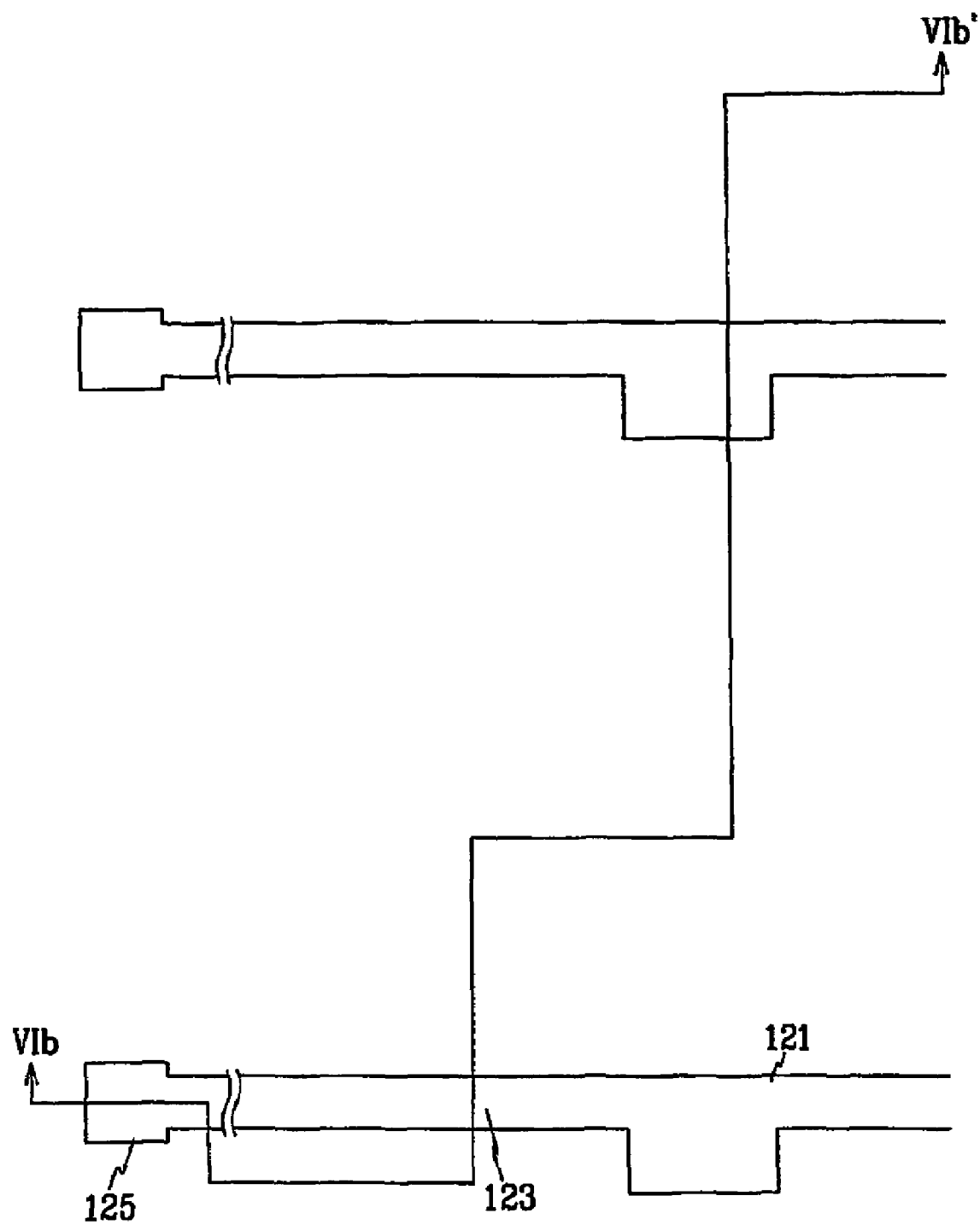
FIGS. 4a, 5a, 6a, and 7a are arrangement view of thin film transistor substrates in the middle of a process for preparing a thin film transistor substrate for a liquid crystal display according to the second example of the present invention.

As shown in FIGS. 4a and 4b, on the glass substrate (110), the lower film (201) consisting of a low conductive resistance material aluminum or aluminum alloy and the upper film (202) consisting of molybdenum and a molybdenum alloy comprising an additive material making a solid compound together with molybdenum are sequentially laminated, and the upper film (202) and the lower film (201) are wet etched by a photo etching process using an aluminum etching solution (HNO3:H3PO4:CH3COOH:H2O) to form gate wiring comprising a gate line (121), a gate electrode (123), and a gate pad (125) with a tapered structure.

Figure 5A:
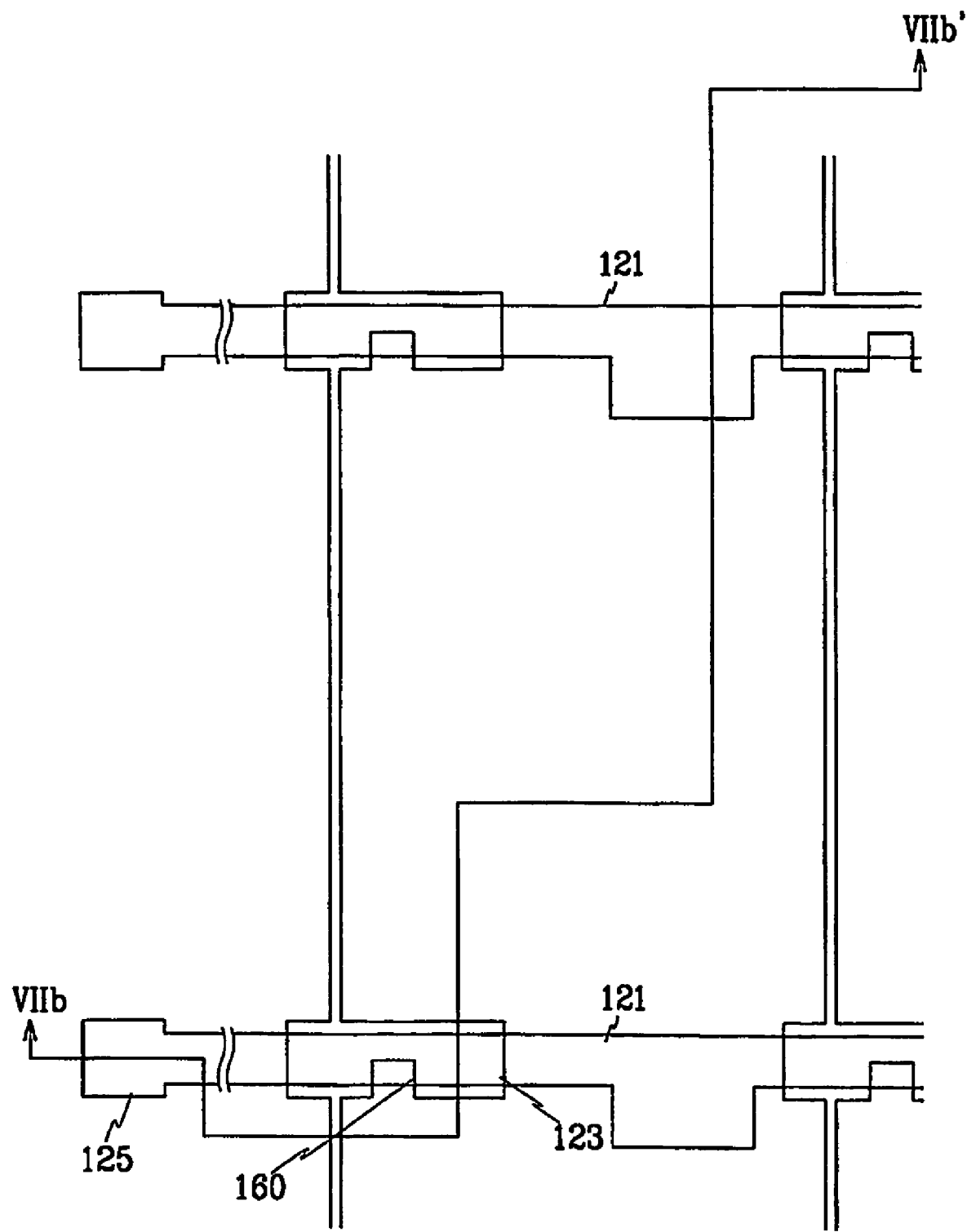
Figure 5B:
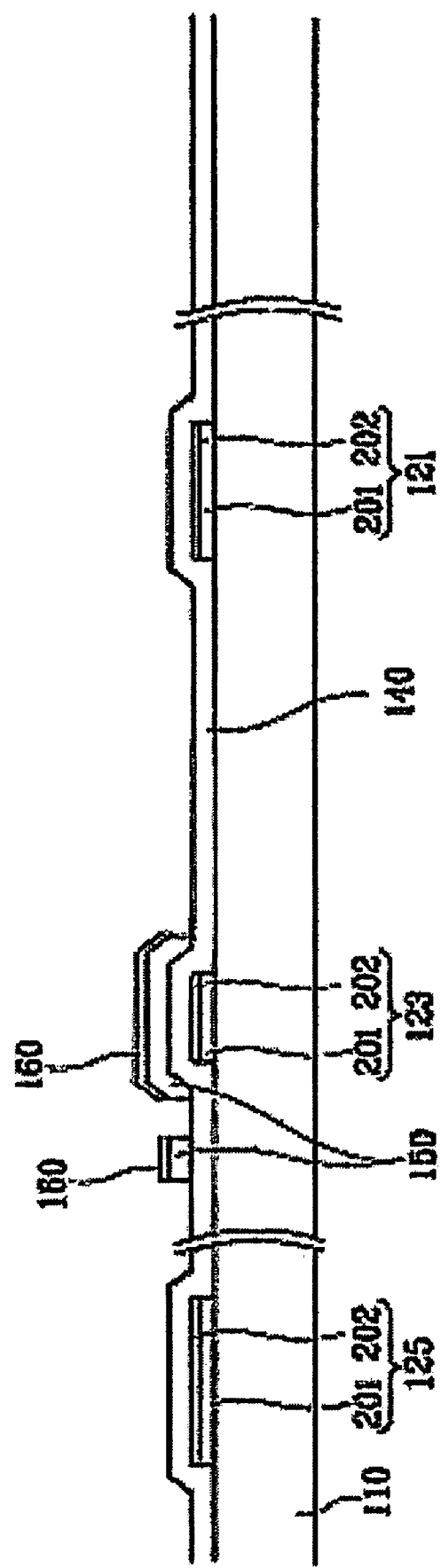
FIG. 5b is a cross-sectional view along the line VIIb-VIIb' in FIG. 5a and showing the next step of FIG. 4b.

Next, as shown in FIGS. 5a and 5b, three layers of a gate insulating film (140) consisting of silicon nitride, a semiconductor layer (150) consisting of amorphous silicon, and a doped amorphous silicon layer (160) are sequentially laminated, and the semiconductor layer (150) and the doped amorphous silicon layer (160) are patterned by a patterning process using a mask to form a semiconductor layer (150) and an ohmic contact layer (160) on the gate insulating film (140) opposed to the gate electrode (123).

Figure 6A:
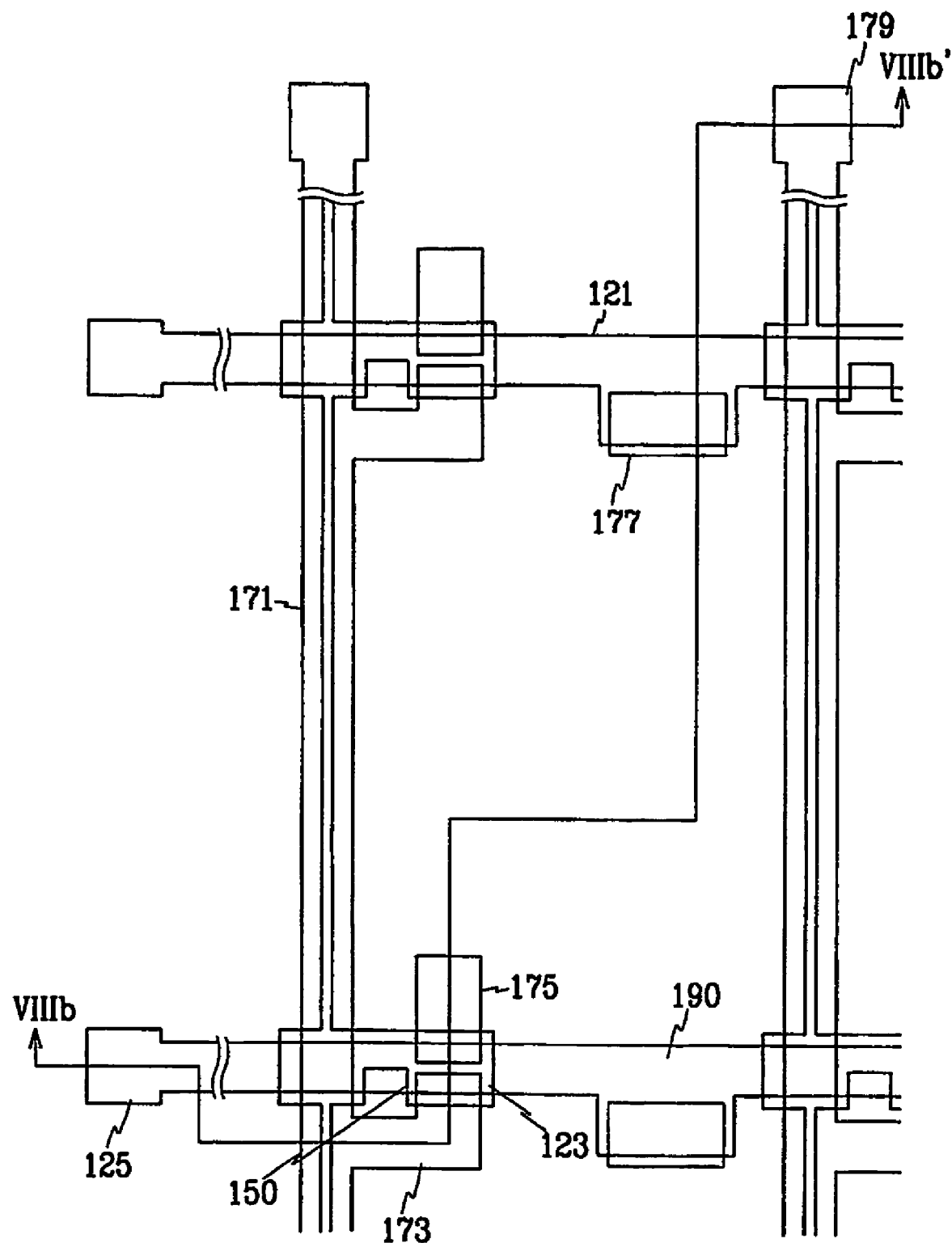
Figure 6B:
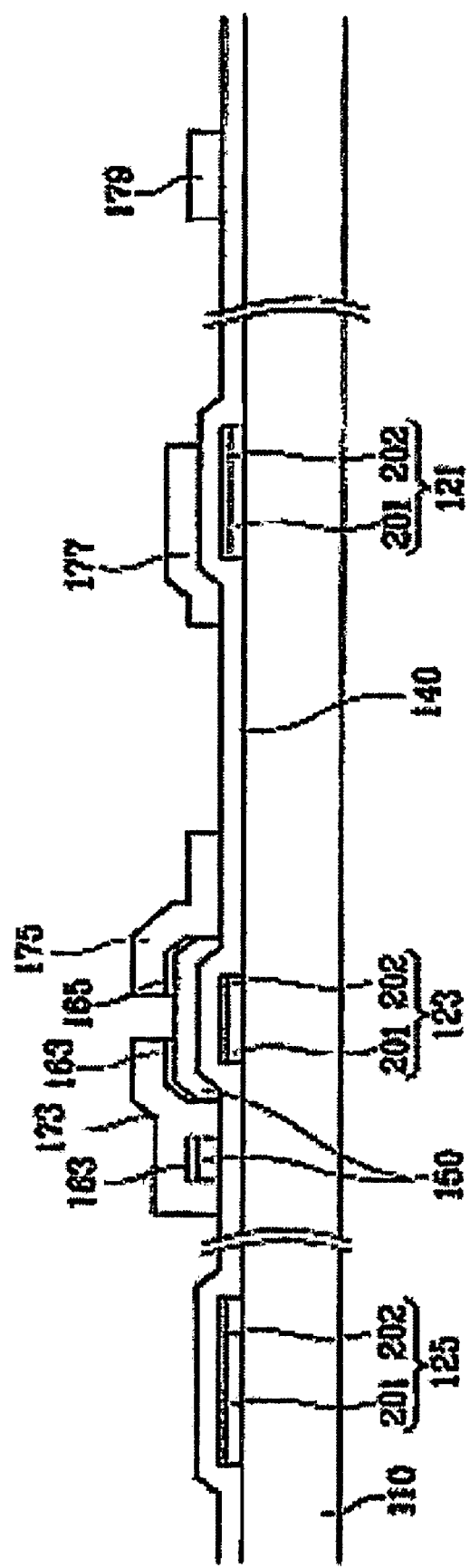
FIG. 6b is a cross-sectional view along the line VIIIb-VIIIb' in FIG. 6a and showing the next step of FIG. 5b.

Then, as shown in FIGS. 6a and 6b, a conductive layer comprising molybdenum and a molybdenum alloy comprising an additive material making a solid compound together with molybdenum is laminated and patterned by a photo etching process using an aluminum etching solution to form data wiring comprising a data line (171) crossed with the gate line (121), a source electrode (173) connected with the data line (171) and extending to the upper part of the gate electrode (123), a data pad (179) connected to one end of the data line (171), a drain electrode (175) separated from the source electrode (173) and opposed to the source electrode (173) around the gate electrode (123), and a conductive pattern (177) for the maintenance capacitor, with a tapered structure.

Next, a doped amorphous silicon layer pattern (160) that is not covered with the data wiring (171, 173, 175, 177, 179) is etched to separate it into both sides around the gate electrode (123) and expose the semiconductor layer pattern (150) between doped amorphous silicon layers (163, 165). It is then preferable to treat with oxygen plasma in order to stabilize the surface of the exposed semiconductor layer (150).

Figure 7A:
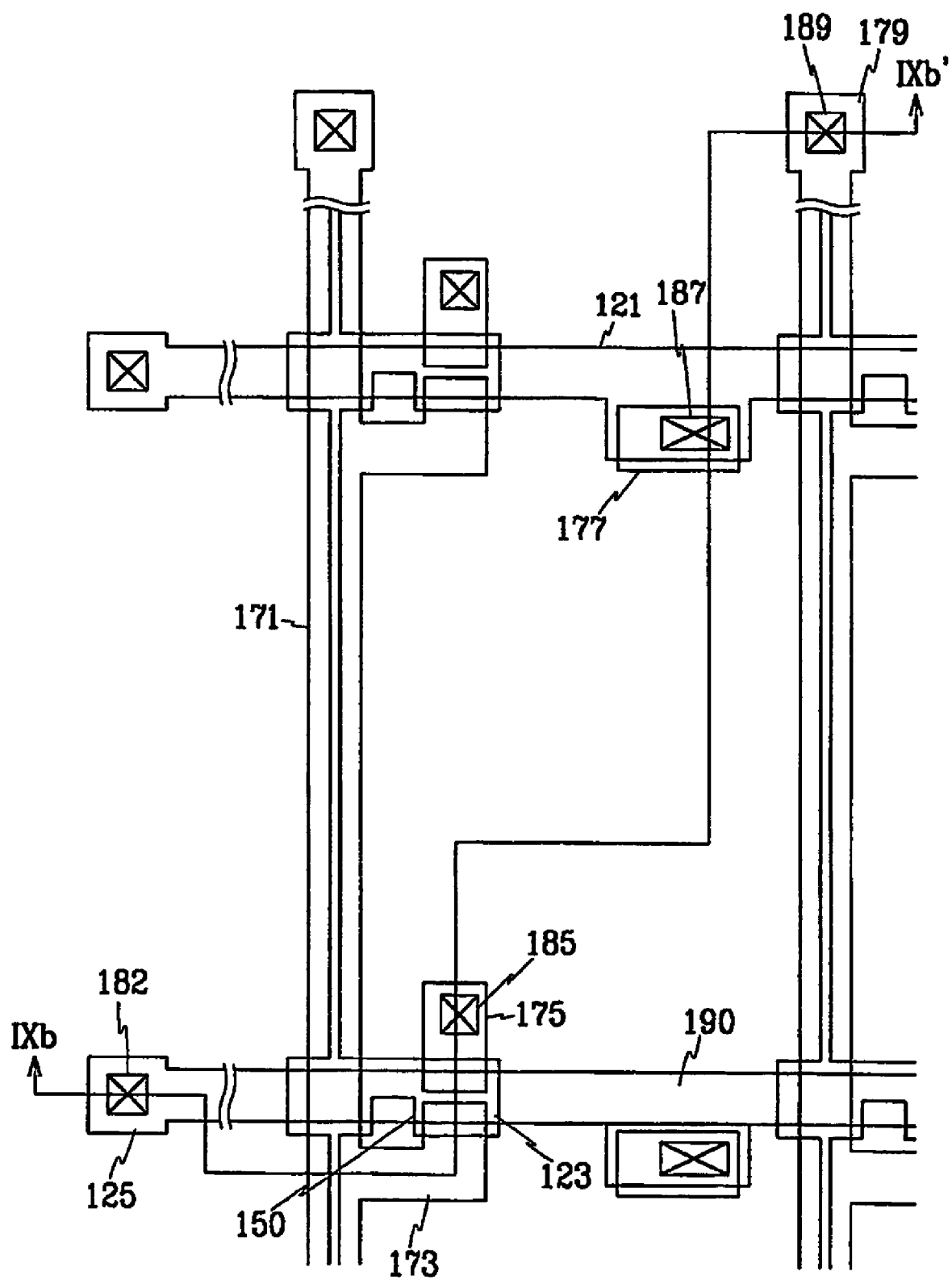
Figure 7B:
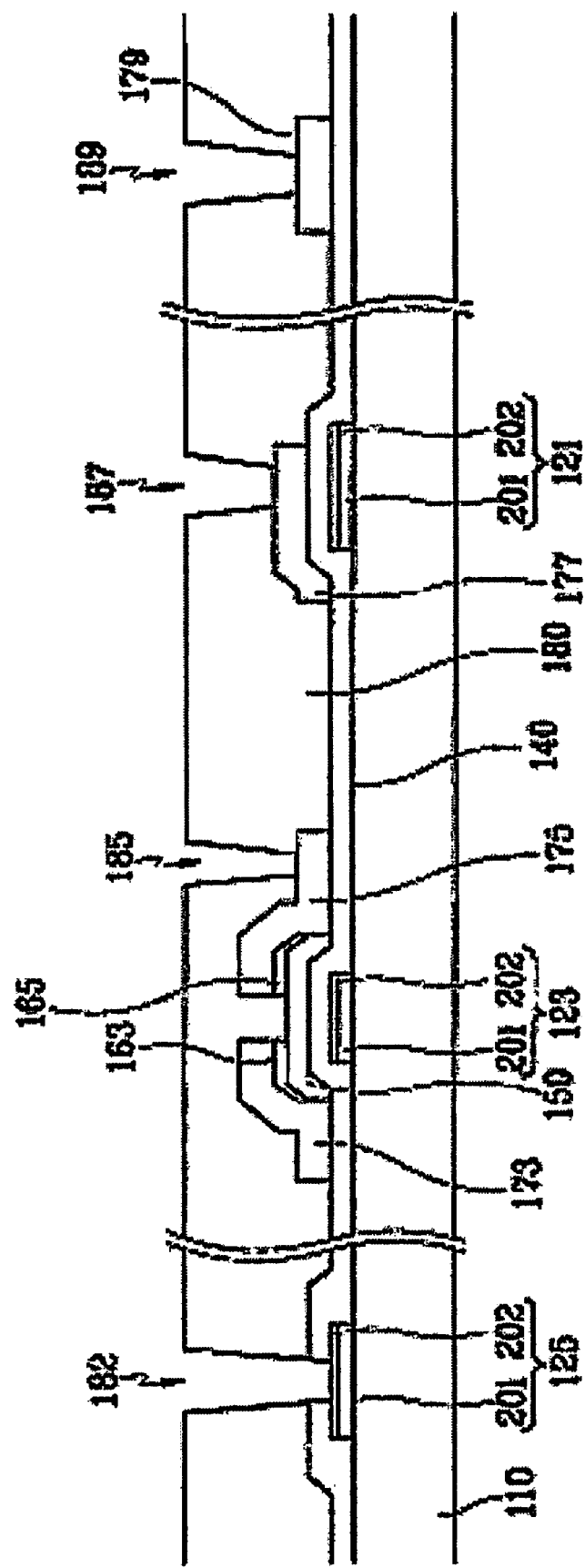
FIG. 7b is a cross-sectional view along the line IXb-IXb' in FIG. 7a and showing the next step of FIG. 6b.

Then, as shown in FIGS. 7a and 7b, a low dielectric CVD film such as a Si:C:O film or a Si:O:F film, etc. is vapor-deposited by laminating silicon nitride, by coating an organic material with superior flattening properties and photo sensitivity on the substrate (110), or by PECVD (plasma enhanced chemical vapor deposition), to form a protection film. Also, the protection film is patterned together with the gate insulating film (140) by a photo etching process using a mask to form contact openings (182, 185, 189, 187) exposing the gate pad (125), drain electrode (175), data pad (179), and conductive pattern for the maintenance capacitor (177).

Next, as shown in FIGS. 2 and 3, a transparent conductive material is vapor deposited and patterned by a photo etching process using a mask to form a pixel electrode (190) connected with the drain electrode (175) and the conductor pattern for the maintenance capacitor (177) through the contact openings (187, 185), and to form a supplementary gate pad (92) and a supplementary data pad (97) respectively connected with the gate pad (125) and the data pad (179) through the contact openings (182, 189).

In addition, although this example of the present invention has been applied and explained for a manufacturing process for forming a semiconductor layer and data wiring by a photo etching process using different masks, the manufacturing process of the wiring according to the present invention can also be applied for a manufacturing process of a thin film transistor array substrate for a liquid crystal display forming a semiconductor layer and data wiring by a photo etching process using one photosensitive film pattern in the same way in order to minimize manufacture costs.

In addition, the wiring comprising a conductive film consisting of molybdenum and a molybdenum alloy comprising an additive material making a solid compound together with molybdenum can also be applied for a COA (color filter on array) structure forming a color filter on a thin film transistor array in the same way. This will be explained in detail with reference to FIGS. 8 and 9.

Figure 8:
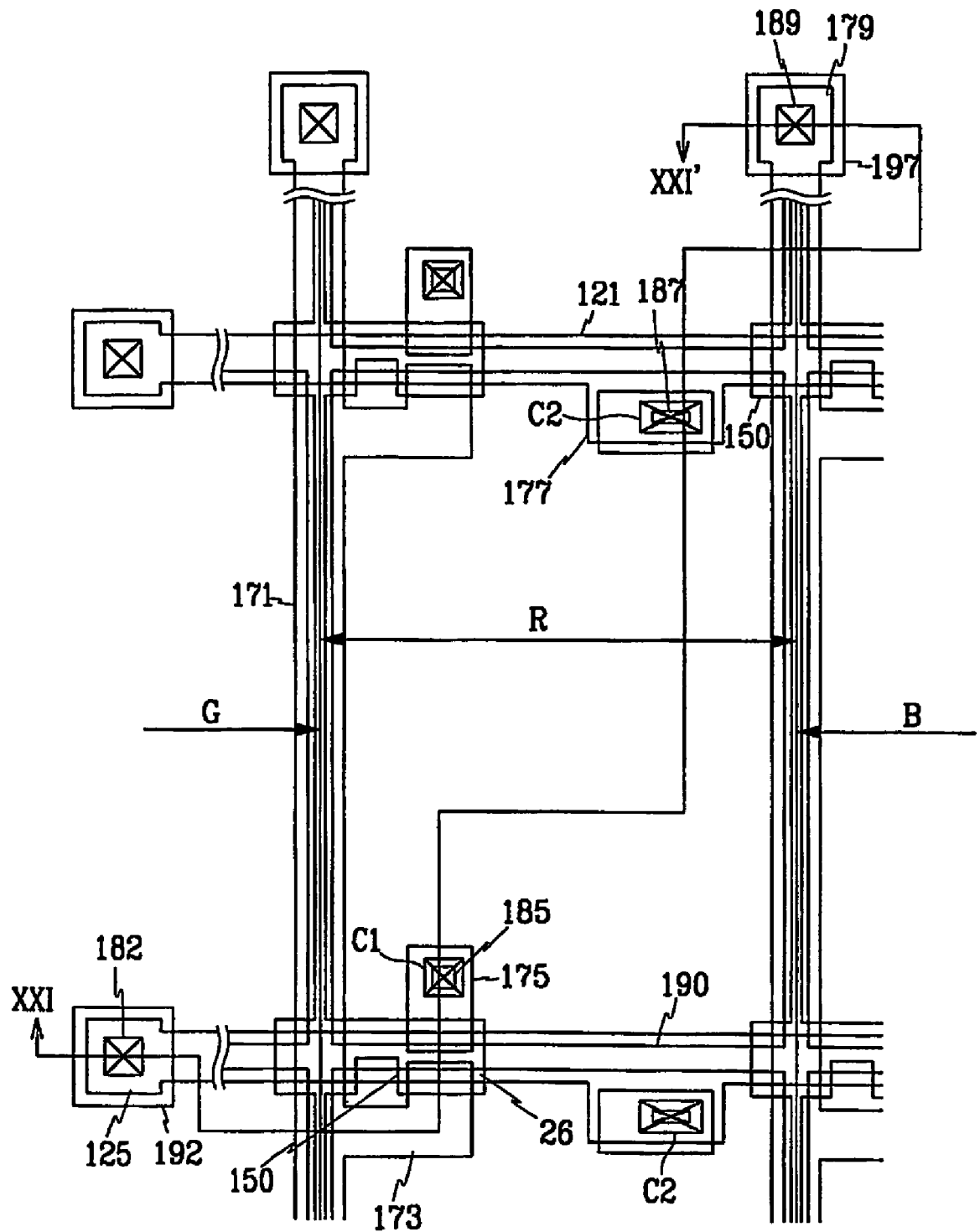
FIG. 8 is an arrangement view showing the structure of a thin film transistor substrate for a liquid crystal display according to a third example of the present invention.
Figure 9:
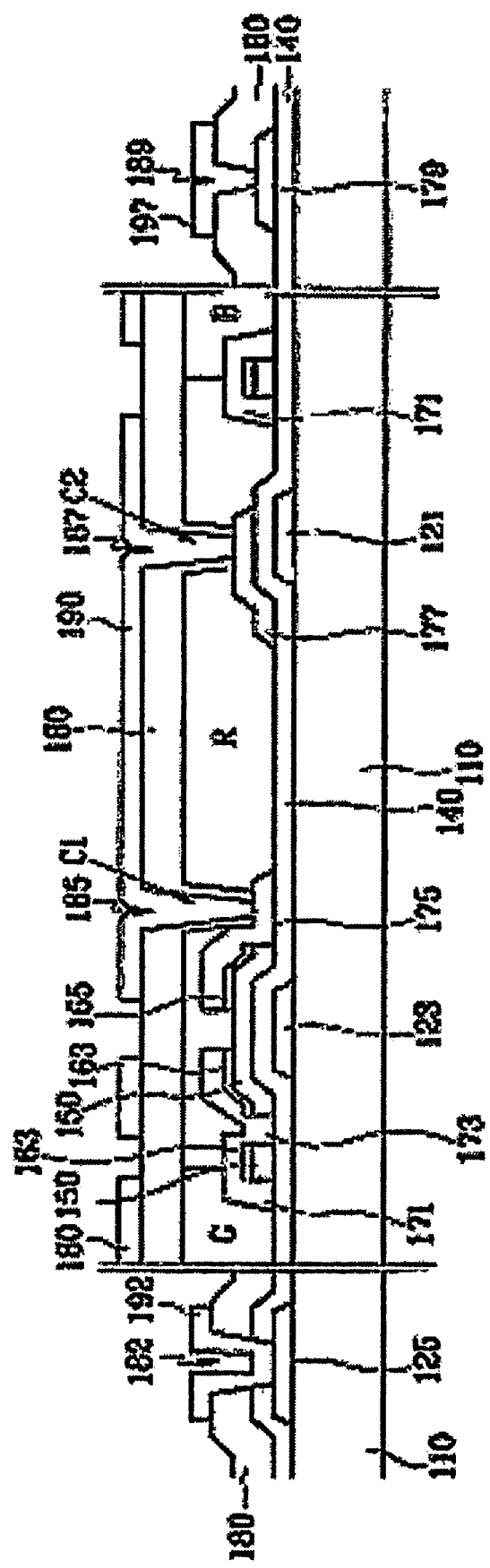
FIG. 9 is a cross-sectional view along the line XXI-XXI' in FIG. 8.

FIG. 8 is an arrangement view showing the structure of a thin film transistor substrate for a liquid crystal display according to the third example of the present invention, and FIG. 9 is a cross-sectional view along the line XXI-XXI' in FIG. 8.

Most of the structures are the same as those of Example 2. However, on the pixel area under the protection film (180), red, green, and blue color filters (R, G, B) having openings (C1, C2) exposing a drain electrode (175) and the conductive pattern for the maintenance capacitor (177) are formed vertically. The boundaries of the red, green, and blue color filters (R, G, B) are shown to be identical on the data line (171), but they can be overlapped with each other on the data line (171) so as to have function for blocking light let out from the pixel area, and they are not formed on a pad part on which gate and data pads (125, 179) are formed.

The protection film (180) on the red, green, and blue color filters (R, G, B) has contact openings (182, 189, 185, 187) exposing the gate pad (125), data pad (179), drain electrode (175), and conductive pattern for the maintenance capacitor (177) together with the gate insulating film (140). The contact openings (185, 187) exposing the drain electrode (175) and the conductive pattern for the maintenance capacitor (177) are located inside the openings (C1, C2) of the color filters (R, G, B).

From the thin film transistor substrate for a liquid crystal display with a COA structure, the same effects as in Example 2 can be obtained.

Now, preferred embodiments of the nematic liquid crystal composition used for a liquid crystal material in the liquid crystal display of the present invention will be explained. However, the following Examples are to illustrate the present invention and the present invention is not limited to them.

EXAMPLE 4

Phase transition temperatures of the compound of the above Chemical Formula 1 is shown in the following Table 1. In the Table 1, "m.p." indicates a temperature when the phase transition from crystal phase to liquid crystal phase or isotropic liquid phase occurs, and "c.p." indicates a temperature when the phase transition from liquid crystal phase to isotropic liquid phase occurs.

Birefringence (Δn) of a single liquid crystal compound was determined by extrapolation of measured birefringence of a 2-component mixed liquid crystal of 85 wt % of a mother liquid crystal 4-(4-hexylcyclohexyl)-1-isothiocyanatobenzene and 15 wt % of each compound shown in Table 1. Impurities were removed from each compound by distillation, column purification, and recrystallization, etc. to sufficiently purify.

TABLE 1

| No. | Molecular structural Formula | Phase transition temperature (° C.) | | Birefringence (Δn) |
|-----|---|---|---|---|
| | | m.p. | c.p. | |
| 1 | $C_3H_7$—⬡—⬡—$CH_2CH_2$—⌬(F)—NCS | 72.9 | 189.0 | 0.246 |
| 2 | $C_3H_7$—⬡—⬡—$CH_2CH_2$—⌬(F,F)—NCS | 81.1 | 175.2 | 0.241 |
| 3 | $C_5H_{11}$—⬡—⬡—$CH_2CH_2$—⌬(F)—NCS | 60.9 | 186.0 | 0.246 |
| 4 | $C_5H_{11}$—⬡—⬡—$CH_2CH_2$—⌬(F,F)—NCS | 50.0 | 175.3 | 0.224 |
| 5 | $C_3H_7$—⬡—$CH_2CH_2$—⌬(F)—NCS | 50.9 | — | 0.135 |
| 6 | $C_3H_7$—⬡—$CH_2CH_2$—⌬(F,F)—NCS | 33.6 | (20.1) | 0.130 |
| 7 | $C_5H_{11}$—⬡—$CH_2CH_2$—⌬(F)—NCS | 29.5 | 44.0 | 0.140 |
| 8 | $C_5H_{11}$—⬡—$CH_2CH_2$—⌬(F,F)—NCS | 9.0 | 33.2 | 0.139 |

COMPARATIVE EXAMPLE 1

A commercial mixture "TM1" comprised as shown in Table 2 was prepared (TM1=G1+G2+G3+G4). Contents of each of G1 to G4 are based on wt %.

TABLE 2

| Compound | Contents (wt %) |
|---|---|
| G1 C$_3$H$_7$–⌬–⌬–OCH$_3$ | 6.6 |
| C$_3$H$_7$–⌬–⌬–(C$_3$H$_7$)$_2$ | 5.4 |
| C$_5$H$_{11}$–⌬–⌬–(C$_2$H$_5$)$_2$ | 20.8 |
| C$_5$H$_{11}$–⌬–⌬–C$_3$H$_7$ | 5.36 |
| G2 C$_2$H$_5$–⌬–⌬–⌬–OCF$_3$ | 7.4 |
| C$_2$H$_5$–⌬–⌬–⌬(F,F,F) | 7.0 |
| C$_2$H$_5$–⌬–⌬–⌬(F)–OCF$_3$ | 2.6 |
| C$_2$H$_5$–⌬–⌬(F)–⌬(F,F,F) | 3.97 |
| G3 (C$_2$H$_5$)$_2$–⌬–⌬–⌬(F,F) | 11.07 |
| C$_3$H$_7$–⌬–⌬–⌬–OCF$_3$ | 3.5 |
| C$_3$H$_7$–⌬–⌬–⌬(F,F,F) | 2.5 |

TABLE 2-continued

| Compound | Contents (wt %) |
|---|---|
| G4 (X is F) 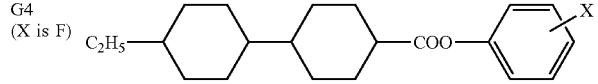 | 3.4 |
| 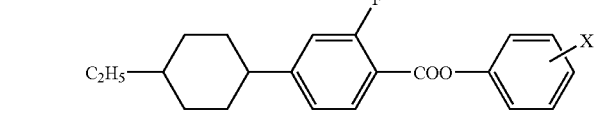 | 10.0 |
| 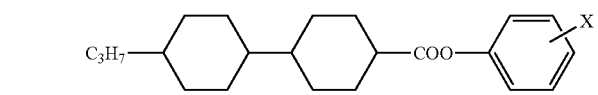 | 10.4 |

The liquid crystal mixture TM1 in Table 2 is a presently-commercialized liquid crystal, and the response speed thereof was measured at 16.2 ms with a cell gap of 4.5 μm and the phase transition temperature was approximately 80° C.

EXAMPLES 5 TO 9

In order to confirm a change in physical properties corresponding to a high-temperature high-speed response, as a key material a compound of the following Chemical Formula 1a with a high phase transition temperature and large refractive anisotropy of the contents as shown in Table 3 and the balance of the mixed liquid crystal TM1 of Comparative Example 1 were mixed, and the phase transition temperature, refractive anisotropy, dielectric anisotropy, and response speed (cell gap 3.75 μm) of the liquid crystal were measured, the results thereof being shown in Table 3.

[Chemical Formula 1a]

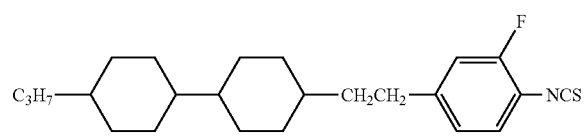

a compound of the above Chemical Formula 1, and particularly, the response speed decreased to 65% and the phase transition temperature increased to 127%, which indicates that they are effective for high-speed high-temperature liquid crystal.

EXAMPLE 10

This Example was conducted by the same method as in Example 5, except that 17 wt % of a compound of the following Chemical Formula 1b was used as the key material, and the phase transition temperature, refractive anisotropy, dielectric anisotropy, and response speed (cell gap 3.75 μm) were measured. The results are as follows.

[Chemical Formula 1d]

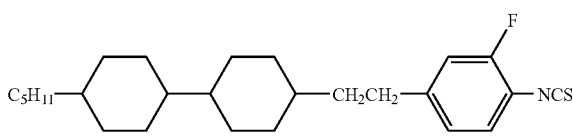

Tni: 98° C./104° C., Δn: 0.1041/0.09(28° C.), Δ∈:/5.9(28° C.),

Response speed: 11 ms (28° C.)

As seen from the results, compared to TM1, response speed decreased to 68% and phase transition temperature

TABLE 3

| | Contents (wt %) | Tni (° C.) | Δ n | Δ∈(20° C.) | Response speed (ms) |
|---|---|---|---|---|---|
| Comparative Example 1 | — | 80 | 0.0773 | 5.9 | 16.2 |
| Example 5 | 7.3 | 88 | 0.0875 | 6.70 | 9.2 |
| Example 6 | 13.2 | 94 | 0.0972 | 7.34 | 9.8 |
| Example 7 | 17.1 | 98/102 | 0.1041(20° C.)/ 0.09(28° C.) | 7.76(20° C.)/ 6.01(28° C.) | 10.4 |
| Example 8 | 20.6 | 101 | 0.1102 | 8.15 | 10 |
| Example 9 | 26 | 108 | 0.1195 | 8.74 | 10.6 |

**denominator: measurement value example – 98° C. (calculation value)/102° C. (measurement value)

As shown in Table 3, Examples 5 to 9 obtained superior results compared to Comparative Example 1 (TM1) without increased to 130%, which indicates that they are effective for high-speed high-temperature liquid crystal.

COMPARATIVE EXAMPLE 2
A commercial mixture "TM1" comprised as shown in Table 4 was prepared (TM1=G1+G2+G3+G4). Contents of each of G1 to G4 are based on wt %.
TABLE 4
| compound | Contents (wt %) |
|---|---|
| G1  | 2.5 |
| 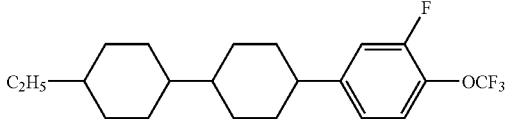 | 2.6 |
|  | 7.4 |
| G2 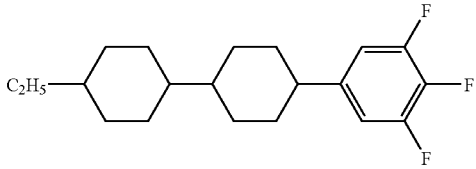 | 7.0 |
| 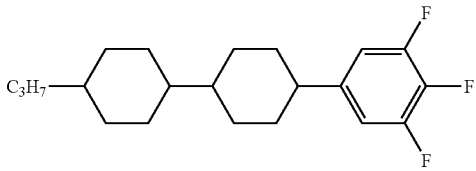 | 3.5 |
| 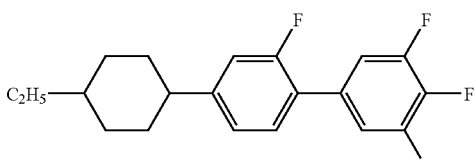 | 3.97 |
| G3 (X is F) 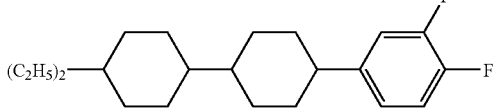 | 11.07 |
| 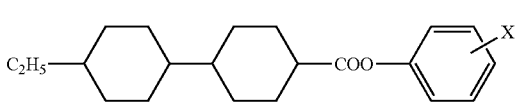 | 3.4 |
| 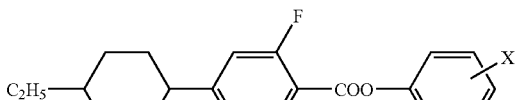 | 10.0 |
| 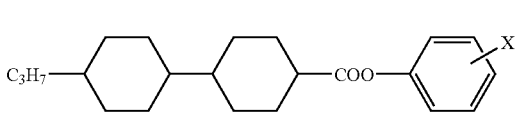 | 10.4 |

TABLE 4-continued

| compound | Contents (wt %) |
|---|---|
| G4 $C_5H_{11}-\bigcirc-\bigcirc-(C_2H_5)_2$ | 20.8 |
| $C_5H_{11}-\bigcirc-\bigcirc-C_3H_7$ | 5.36 |
| $C_3H_7-\bigcirc-\bigcirc-OCH_3$ | 6.6 |
| $C_3H_7-\bigcirc-\bigcirc-(C_3H_7)_2$ | 5.4 |

The liquid crystal mixture TM1 in the above Table 4 is a presently-commercialized liquid crystal, and the response speed thereof was measured at 16.2 ms at a cell gap of 4.6 μm and the phase transition temperature was about 80° C.

EXAMPLES 11 TO 15

In order to confirm a change in physical properties corresponding to a high-temperature high-speed response, as a key material, a compound of the following Chemical Formula 1c with a high phase transition temperature and a large refractive anisotropy of the contents as shown in Table 5, and the balance of the mixed liquid crystal TM1 of Comparative Example 2 were mixed, and the phase transition temperature, refractive anisotropy, dielectric anisotropy, and response speed (cell gap 3.77 μm) were measured according to % concentration, results thereof being shown in Table 5.

As shown from the Table 5, Examples 11 to 15 obtained superior results compared to Comparative Example 2 (TM1) without a compound of the above Chemical Formula 1, and particularly, response speed decreased to 60% and phase transition temperature increased to 122%, which indicates that they are effective for high-speed high-temperature liquid crystal.

EXAMPLE 16

This example was conducted by the same method as in Example 5, except that 17 wt % of the compound of the following Chemical Formula 1d was used as the key material, and phase transition temperature, refractive anisotropy, dielectric anisotropy, and response speed (cell gap 3.86 μm) were measured. The results are as follows.

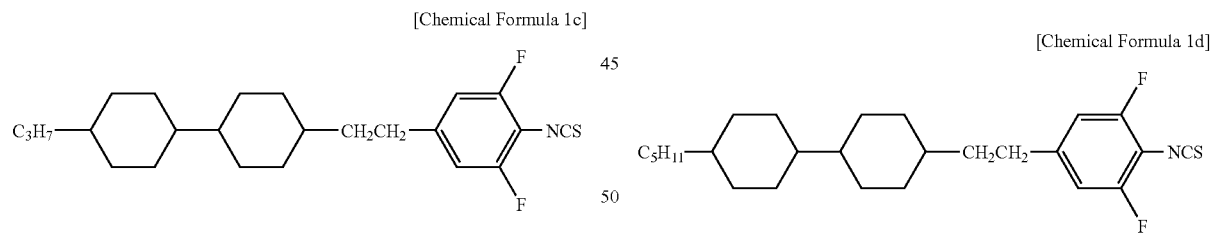

[Chemical Formula 1c] / [Chemical Formula 1d]

TABLE 5

|  | Contents (wt %) | Tni (° C.) | Δ n | Δε(20° C.) | Response speed (ms) |
|---|---|---|---|---|---|
| Comparative Example 2 | — | 80 | 0.0773 | 5.9 | 16.2 |
| Example 11 | 7 | 87 | 0.0866 | 6.7 | 9.1 |
| Example 12 | 14 | 93 | 0.0982 | 7.5 | 9.7 |
| Example 13 | 16.7 | 96/98.3 | 0.1027(20° C.)/ 0.0907(28° C.) | 7.8(20° C.)/ 6.7(28° C.) | 10.2 |
| Example 14 | 20 | 99 | 0.1082 | 8.2 | 10.3 |
| Example 15 | 26 | 104 | 0.1181 | 8.9 | 10.7 |

**denominator: measurement value, Example 96° C. (calculation value)/98.3° C. (measurement value)

Tni: 98° C./100° C., Δn: 0.1003/0.0908(28° C.), Δ∈: 7.7(20° C.)/6.2(28° C.),

Response speed: 11 ms (28° C.)

As seen from the results, compared to TM1, the response speed decreased to 68% and phase transition temperature increased to 130%, which indicates that the compositions of the present invention are effective for a high-speed high-temperature liquid crystal. So far reported NCS mixtures have phase transition temperatures, refractive indexes, and response speeds of Tni: 71° C., Δn: 0.15, response speed: 14.6 ms, and in this case, they have low phase transition temperatures and high refractive indexes and thus are difficult to be made into products, and in the case they have Tni: 95° C., Δn: 0.089, and response speed: 21.3 ms, the response speed is slow and thus they are difficult to use for a high-speed high-temperature liquid crystal corresponding to moving pictures. Meanwhile, Examples of the present invention simultaneously satisfy high speed and high temperature characteristics corresponding to moving pictures and thus they are likely to be made into products.

Although preferred examples of the present invention have been explained in detail, the scope of the right of the present invention is not limited to them, and various modifications and improvements can be made by an ordinarily skilled person within the basic idea of the present invention defined in the following claims.

As explained, the nematic liquid crystal compound of the above Chemical Formula 1 or Chemical Formula 2 according to the present invention and a liquid crystal composition comprising the same have a large birefringence (Δn), elasticity coefficient, and dielectric anisotropy (Δ), low threshold voltage (Vth) and viscosity, a broad operating nematic phase temperature range, a high voltage holding ratio (VHR), and superior chemical stability. In addition, they have high phase transition temperatures compared to a commercial-mixed liquid crystal and can realize a high response speed, and thus if they are used for twist nematic (TN) or super twist nematic (STN) liquid crystal displays, or for active matrix (AM) method thin film transistor (TFT) liquid crystal displays, afterimage and crosstalk can be improved, and they are effective for making response speed high and lowering operation voltage because they have low viscosity and a large elasticity coefficient.

What is claimed is:

1. A nematic liquid crystal composition comprising:
   a) liquid crystal compound represented by the following Chemical Formula 1:

[Chemical Formula 1]

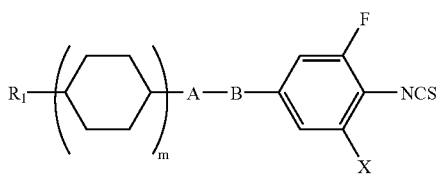

wherein $R_1$ is $C_nH_{2n+1}O$, $C_nH_{2n+1}$, or $C_nH_{2n-1}$ (n is 1-15); X is H or F; A is

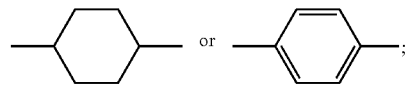

B is —$CH_2$—$CH_2$— or —C≡C—; and m is 0 or 1; and
   b) a liquid crystal compound represented by the following Chemical Formula 6:

[Chemical Formula 6]

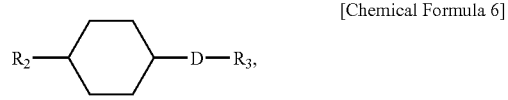

wherein $R_2$ and $R_3$ are independently or simultaneously a C1-15 alkyl group or alkoxy group; D is phenyl or cyclohexyl; and
   (c) at least one kind of liquid crystal compound selected from a group consisting of compounds represented by the following Chemical Formula 7 and Chemical Formula 8:

[Chemical Formula 7]

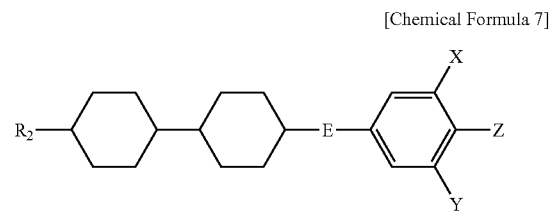

[Chemical Formula 8]

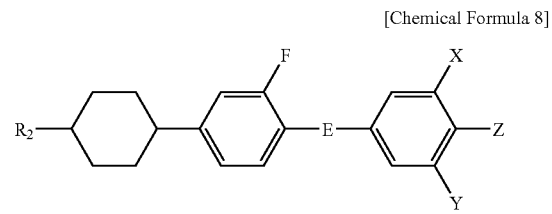

wherein $R_2$ is a C1-15 alkyl group or alkoxy group; E is a single bond —$CH_2CH_2$— or —COO—; X and Y are independently or simultaneously a hydrogen or fluorine atom; and Z is a hydrogen, —$OCF_3$, or a fluorine atom;
   wherein a) is contained in 2 to 80 wt % of the total amount of the nematic liquid crystal composition, and the sum of b) and c) is contained in 20 to 98 wt % of the total amount of the nematic liquid crystal composition.

2. A liquid crystal cell for a liquid crystal display wherein the nematic liquid crystal composition of claim 1 is injected between two glass substrates or plastic substrates as liquid crystal.

3. The liquid crystal cell for a liquid crystal display according to claim 2, wherein the liquid crystal cell comprises transparent electrodes making up pixels inside the substrates, and an orientation film for orienting liquid crystal molecules toward one direction on the transparent electrodes.

4. The liquid crystal cell for a liquid crystal display according to claim 2, wherein the liquid crystal cell has a phase transition temperature of at least 85° C. and a response speed of 9 to 11 ms.

5. A liquid crystal display comprising the nematic liquid crystal composition of claim 1.

6. A liquid crystal display comprising:
a first substrate having an outside and an inside;
a second substrate opposed to the first substrate and having an outside and an inside;
pixel electrodes formed on one of the insides of the first substrate and the second substrate;
common electrodes formed on one of the insides of the first substrate and the second substrate; and
liquid crystal cells wherein the nematic liquid crystal composition of claim 1 is injected between the first substrate and the second substrate as liquid crystal,
wherein the liquid crystal display has a standardized contrast ratio of 0.8 or more in every view angle, where the standardized contrast ratio for applying 0V of 1-gradation voltage between the pixel electrode and the common electrode is 1.

7. The liquid crystal display according to claim 6, wherein the display further comprises a first polarizing plate arranged outside of the first substrate and second polarizing plate arranged outside of the second substrate, and the polarizing axes of the first polarizing plate and the second polarizing plate are perpendicular to each other.

8. The liquid crystal display according to claim 6, wherein the liquid crystal is oriented perpendicularly to the first and the second substrates when voltage is not applied between the pixel electrode and the common electrode.

9. The liquid crystal display according to claim 6, wherein the pixel electrode and the common electrode further comprise domain-regulating means for regulating an inclined direction of the liquid crystal, formed on at least one side of the first substrate and the second substrate.

10. The liquid crystal display according to claim 6, wherein the liquid crystal display comprises
an insulating substrate;
gate wiring formed on the insulating substrate and comprising gate lines and gate electrodes connected to the gate lines;
a gate insulating film covering the gate wiring,
a semiconductor layer formed on the gate insulating film;
data wiring formed on the semiconductor layer and comprising data lines crossed with the gate lines, source electrodes connected to the data lines, and drain electrodes opposed to the source electrodes around the gate electrodes, and
a thin film transistor array substrate comprising pixel electrodes connected-to-the drain electrodes as the second substrate.

11. The liquid crystal display according to claim 10, wherein the thin film transistor array substrate further comprises a protection film formed between the data wiring and the pixel electrodes.

12. The liquid crystal display according to claim 10, wherein the thin film transistor array substrate further comprises an ohmic contact layer formed between the semiconductor layer and the data wiring, being doped with a high concentration of impurities.

13. The liquid crystal display according to claim 10 further comprising red, green, and blue color filters formed on the gate wiring and the data wiring.

14. A nematic liquid crystal composition comprising:
a) a liquid crystal compound represented by the following Chemical Formula 1:

[Chemical Formula 1]

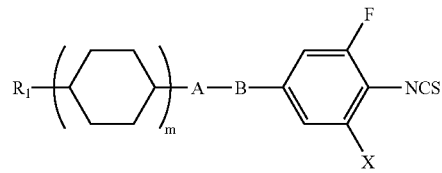

wherein $R_1$ is $C_nH_{2n+1}O$, $C_nH_{2n+1}$, or $C_nH_{2n-1}$ (n is 1-15); X is H or F; A is

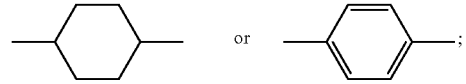

m is 0 or 1, and B is —C≡C— where m is 0, or B is —CH$_2$—CH$_2$—or —C≡C— where m is 1; and b) a liquid crystal compound represented by the following Chemical Formula 6:

[Chemical Formula 6]

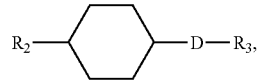

wherein $R_2$ and $R_3$ are independently or simultaneously a C1-15 alkyl group or alkoxy group; and D is phenyl or cyclohexyl.

* * * * *